United States Patent
Tsujita et al.

(10) Patent No.: US 12,315,877 B2
(45) Date of Patent: May 27, 2025

(54) SOLID ELECTROLYTE AND MAGNESIUM SECONDARY BATTERY USING SAME

(71) Applicants: Panasonic Corporation, Osaka (JP); National Institute for Materials Science, Ibaraki (JP)

(72) Inventors: Takuji Tsujita, Osaka (JP); Yu Nishitani, Osaka (JP); Kensuke Nakura, Osaka (JP); Tohru Tsuruoka, Ibaraki (JP); Kazuya Terabe, Ibaraki (JP); Jin Su, Ibaraki (JP)

(73) Assignees: PANASONIC HOLDINGS CORPORATION, Osaka (JP); NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 762 days.

(21) Appl. No.: 17/483,842

(22) Filed: Sep. 24, 2021

(65) Prior Publication Data
US 2022/0029194 A1   Jan. 27, 2022

Related U.S. Application Data

(63) Continuation of application No. PCT/JP2020/006632, filed on Feb. 19, 2020.

(30) Foreign Application Priority Data

Mar. 28, 2019 (JP) ................... 2019-062879

(51) Int. Cl.
*H01M 10/0562* (2010.01)
*C01B 25/45* (2006.01)
(Continued)

(52) U.S. Cl.
CPC ......... *H01M 10/0562* (2013.01); *C01B 25/45* (2013.01); *H01B 1/08* (2013.01);
(Continued)

(58) Field of Classification Search
CPC ........... H01M 10/0562; H01M 10/054; H01M 10/0568; H01M 2300/002; H01M 2300/0068
See application file for complete search history.

(56) References Cited

U.S. PATENT DOCUMENTS

2014/0113193 A1* 4/2014 Tsunozaki ............. H01M 4/485
429/223
2017/0092939 A1* 3/2017 Kim .................. H01M 10/0569
(Continued)

FOREIGN PATENT DOCUMENTS

CN   108336328 A   7/2018
JP   2018-098172 A   6/2018
(Continued)

OTHER PUBLICATIONS

Search Report for the corresponding Chinese Patent Application No. 202080023693.X, with English translation.
(Continued)

*Primary Examiner* — Basia A Ridley
*Assistant Examiner* — Jonathan William Estes
(74) *Attorney, Agent, or Firm* — Rimon P.C.

(57) ABSTRACT

A solid electrolyte according to the present disclosure has a composition represented by $Mg_xZr_y(PO_z)_2$ ($0<x\leq3.5$, $0\leq y<1.5$, and $3\leq z\leq4.25$), and includes an amorphous part. The composition may be represented by $Mg_x(PO_z)_2$ ($3\leq x\leq3.5$ and $3\leq z\leq4.25$). The composition may be represented by $Mg_xZr_y(PO_z)_2$ ($0<x<3.5$, $0<y<1.5$, and $3\leq z\leq4.25$).

10 Claims, 18 Drawing Sheets

(51) Int. Cl.
  *H01B 1/08* (2006.01)
  *H01M 10/054* (2010.01)
  *H01M 10/0568* (2010.01)

(52) U.S. Cl.
  CPC ..... *H01M 10/054* (2013.01); *H01M 10/0568* (2013.01); *C01P 2002/50* (2013.01); *C01P 2002/72* (2013.01); *C01P 2006/40* (2013.01); *H01M 2300/002* (2013.01); *H01M 2300/0068* (2013.01)

(56) References Cited

U.S. PATENT DOCUMENTS

| | | | |
|---|---|---|---|
| 2018/0159170 A1 | | 6/2018 | Fujinoki et al. |
| 2018/0159177 A1 | | 6/2018 | Tsujita et al. |
| 2018/0205073 A1 | | 7/2018 | Natsui et al. |
| 2020/0403266 A1 | * | 12/2020 | Hu .................... H01M 10/0585 |

FOREIGN PATENT DOCUMENTS

| | | |
|---|---|---|
| JP | 2018-107106 A | 7/2018 |
| WO | 2012/176904 A1 | 12/2012 |
| WO | 2017/119208 A1 | 7/2017 |

OTHER PUBLICATIONS

International Search Report issued in corresponding International Patent Application No. PCT/JP2020/006632, dated May 26, 2020, with Englsih translation.

S. Ikeda et al., "Solid Electrolytes With Multivalent Cation Conduction," Solid State Ionics, North-Holland, Amsterdam, vol. 23, 1987, pp. 125-129.

* cited by examiner

SOLID ELECTROLYTE AND MAGNESIUM SECONDARY BATTERY USING SAME

This application is a continuation of PCT/JP2020/006632 filed on Feb. 19, 2020, which claims foreign priority of Japanese Patent Application No. 2019-062879 filed on Mar. 28, 2019, the entire contents of both of which are incorporated herein by reference.

BACKGROUND OF THE INVENTION

1. Field of the Invention

The present disclosure relates to a solid electrolyte and a magnesium secondary battery including the solid electrolyte.

2. Description of Related Art

In recent years, magnesium secondary batteries have been expected to be practically applied. Magnesium secondary batteries have high theoretical capacity densities compared to conventional lithium ion batteries.

JP2018-107106 A discloses a solid electrolyte composed of an oxide containing magnesium, silicic acid, and zirconium.

S. Ikeda et. al., Solid State Ionics 23 (1987) 125-129. discloses a solid electrolyte composed of an oxide containing magnesium, phosphoric acid, and zirconium, and reports improvement of magnesium ionic conductivity by addition of zirconium to magnesium phosphate.

Also, it is generally known that magnesium phosphate composed of only a crystalline part cannot achieve magnesium ionic conductivity.

SUMMARY OF THE INVENTION

The present disclosure provides a novel solid electrolyte capable of conducting magnesium ions and a secondary battery using the solid electrolyte. The present disclosure provides a solid electrolyte having a composition represented by $Mg_xZr_y(PO_z)_2$ ($0<x\leq3.5$, $0\leq y<1.5$, and $3\leq z\leq 4.25$) and including an amorphous part.

According to the present disclosure, a novel solid electrolyte conducting magnesium ions and a secondary battery using the solid electrolyte can be provided.

Figure 1:
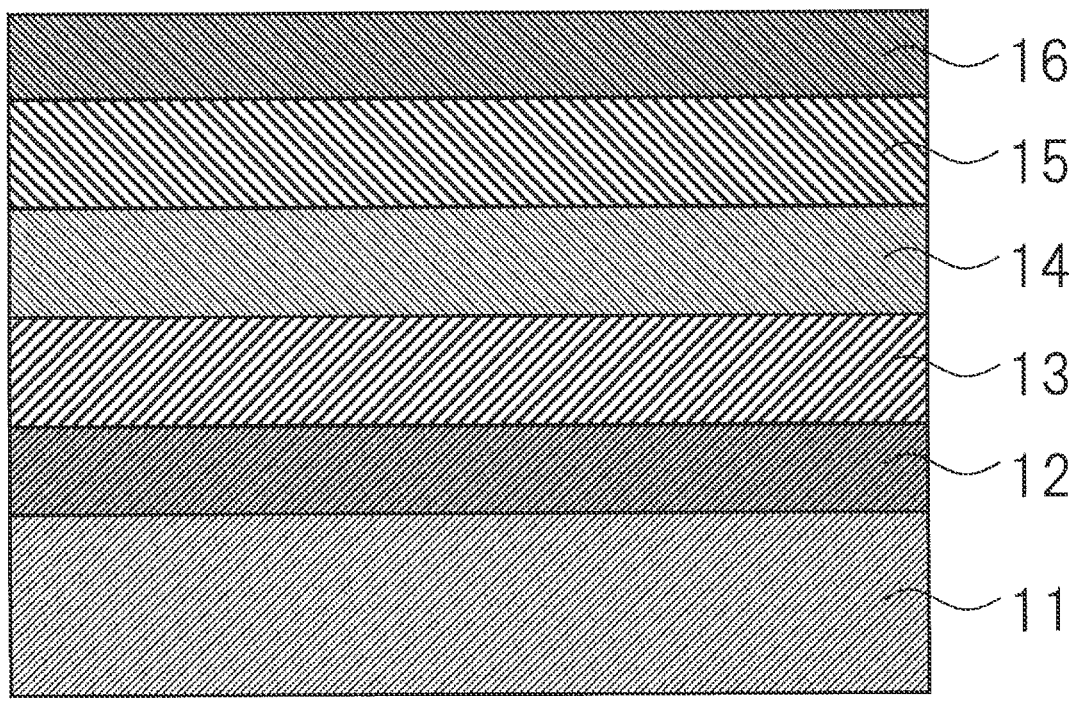
FIG. 1 is a cross-sectional view schematically showing a structural example of a secondary battery according to an embodiment of the present disclosure.

DETAILED DESCRIPTION (Outline of One Aspect According to the Present Disclosure)

A solid electrolyte according to a first aspect of the present disclosure has a composition represented by $Mg_xZr_y(PO_z)_2$ ($0<x\leq3.5$, $0\leq y<1.5$, and $3\leq z\leq 4.25$) and includes an amorphous part.

According to the first aspect, a solid electrolyte exhibiting an excellent magnesium ionic conductivity can be achieved.

In a second aspect of the present disclosure, for example in the solid electrolyte according to the first aspect, the composition may be represented by $Mg_x(PO_z)_2$ ($3\leq x\leq 3.5$ and $3\leq z\leq 4.25$). With this structure, the solid electrolyte exhibiting an excellent magnesium ionic conductivity can be achieved.

In a third aspect of the present disclosure, for example in the solid electrolyte according to the first aspect, the composition may be represented by $Mg_xZr_y(PO_z)_2$ ($0<x<3.5$, $0<y<1.5$, and $3\leq z\leq 4.25$). With this structure, structural stability of magnesium phosphate can be improved.

A covering material of an electrode active material of a magnesium secondary battery according to a fourth aspect of the present disclosure is a covering material for covering an electrode active material of a magnesium secondary battery, and the covering material includes the solid electrolyte according to any one of the first to third aspects.

In a fifth aspect of the present disclosure, for example in the covering material of the electrode active material of the magnesium secondary battery according to the fourth aspect, the electrode active material may be a positive electrode active material.

In a sixth aspect of the present disclosure, for example in the covering material of the electrode active material of the magnesium secondary battery according to the fourth aspect, the electrode active material may be a negative electrode active material.

According to the fourth to the sixth aspects, it is possible to prevent decomposition of an electrolyte solution due to electron transfer on contact surfaces between an electrode and the electrolyte solution.

An electrode material of a magnesium secondary battery according to a seventh aspect of the present disclosure includes:

an electrode active material particle; and
a surface layer covering the electrode active material particle, wherein
the surface layer includes the covering material for covering an electrode active material of the magnesium secondary battery according to the fourth aspect.

In an eighth aspect of the present disclosure, for example in the electrode material of the magnesium secondary battery according to the seventh aspect, the electrode active material particle may be a positive electrode active material particle.

In a ninth aspect of the present disclosure, for example in the electrode material of the magnesium secondary battery according to the seventh aspect, the electrode active material particle may be a negative electrode active material particle.

An electrode layer of the magnesium secondary battery according to a tenth aspect of the present disclosure includes the electrode material according to any one of the seventh to the ninth aspects.

According to the seventh to tenth aspects, surfaces of the electrode active material particles are not exposed or are less likely to be exposed in gaps between the electrode active material particles. Thus, even in the case for example where the electrolyte solution fills theses gaps, oxidative decomposition or reductive decomposition of the electrolyte solution can be further effectively suppressed.

An electrode layer of a magnesium secondary battery according to an eleventh aspect of the present disclosure includes:

an electrode active material layer including electrode active material particles; and
a surface layer that is disposed on one principal surface of the electrode active material layer and includes the covering material for covering an electrode active material of the magnesium secondary battery according to the fourth aspect.

In a twelfth aspect of the present disclosure, for example in the electrode layer of the magnesium secondary battery according to the eleventh aspect, the electrode active material particles may be positive electrode active material particles.

In a thirteenth aspect of the present disclosure, for example in the electrode layer of the magnesium secondary battery according to the eleventh aspect, the electrode active material particles may be negative electrode active material particles.

According to the eleventh to thirteenth aspects, it is possible to prevent decomposition of an electrolyte solution due to electron transfer on contact surfaces between an electrode and the electrolyte solution.

An electrode of a magnesium secondary battery according to a fourteenth aspect of the present disclosure includes:

the electrode layer according to any one of the tenth to the thirteenth aspects; and
a current collector supporting the electrode layer and being in electrical contact with the electrode layer.

According to the fourteenth aspect, an electrode manufacturing method is easy.

A magnesium secondary battery according to a fifteenth aspect of the present disclosure includes:

the electrode according to the fourteenth aspect; and
an electrolyte solution containing a nonaqueous solvent and a magnesium salt dissolved in the nonaqueous solvent.

According to the fifteenth aspect, it is possible to suppress decomposition of the electrolyte solution while maintaining electrical properties of the secondary battery. As a result, the secondary battery can be stabilized, and thus can have a prolonged operating life.

The embodiments will now be described in further detail with use of the drawings.

All the descriptions below show comprehensive or specific examples. Numerical values, compositions, shapes, film thicknesses, electrical properties, structures of secondary batteries, electrode materials, etc. shown below are illustrative and are not intended to limit the present disclosure. In addition, those elements that are not recited in any independent claim, which defines the most generic concept, are optional.

Embodiment

1. Solid Electrolyte

Solid electrolytes for secondary batteries will now be mainly described, but the use of the solid electrolytes of the present disclosure is not limited thereto. The solid electrolytes may be used for, for example, electrochemical devices such as ion concentration sensors.

1-1. Structure of Solid Electrolyte

An electrostatic interaction of a divalent magnesium ion with an anion in a solid electrolyte is high compared to that of a monovalent lithium ion. Thus, magnesium ions are less likely to diffuse in a solid electrolyte. Accordingly, solid electrolytes conducting magnesium ions are desired to be improved in ionic conductivity.

In response to this desire, the present inventors have found the following novel solid electrolyte.

The solid electrolyte according to the present embodiment has a composition represented by $Mg_xZr_y(PO_z)_2$ (where, $0<x\leq3.5$, $0\leq y<1.5$, and $3\leq z\leq4.25$), and includes an amorphous part.

The "solid electrolyte" in the present disclosure is not limited to those that strictly satisfy the above-mentioned formula and may contain a trace amount of impurities other than the constitutional elements represented by the formula.

The "amorphous material" in the present disclosure is not limited to a material having no crystal structure at all, and includes a material having a crystalline region within a range of short-range order. An amorphous material for example refers to a material that does not exhibit a sharp peak derived from a crystal and exhibits a broad peak derived from a noncrystalline material in X-ray diffraction (XRD).

An expression "a solid electrolyte includes an amorphous part" means that the solid electrolyte is at least partially amorphous. From the viewpoint of magnesium ionic conduction properties, the solid electrolyte may be entirely amorphous. In the case where the solid electrolyte is in the form of particle, the particles formed from the solid electrolyte may be entirely amorphous. In the case where the solid electrolyte is in the form of thin film, the thin film formed from the solid electrolyte may be entirely amorphous.

The solid electrolyte according to the present embodiment may include no crystalline part. The solid electrolyte according to the present embodiment may be substantially composed of an amorphous part, or may include only an amorphous part. This broadens the distance between atoms and/or ions constituting the solid electrolyte. Thus, a space where magnesium ions can move is broadened, thereby further reducing an electrostatic attractive force applied to magnesium ions given from surrounding ions. Consequently, the solid electrolyte can exhibit excellent magnesium ionic conduction properties.

For example, in the case where the solid electrolyte is in the form of thin film, an X-ray diffraction measurement is performed at a plurality of arbitrary positions of the thin film. In the case where no sharp peak is observed at any position, the solid electrolyte can be determined as being entirely amorphous, being substantially composed of an amorphous part, or including only an amorphous part.

The solid electrolyte according to the present embodiment can exhibit a high magnesium ionic conductivity. This is probably caused by the following reasons.

The solid electrolyte according to the present embodiment is composed of coordination polyhedra and magnesium ions disposed between these coordination polyhedra in a region of short-range order. A coordination polyhedron is basically an octahedron composed of six-coordinate oxygen ions surrounding a phosphorus atom, and is represented by a composition formula of phosphate ion $(PO_4)^{3-}$. Note that a coordination polyhedron may be partially ions as a condensate of a plurality of phosphate ions represented by a composition formula of $P_xO_{1+3x}$, or a double bond formed by phosphorus and residual oxygen after desorption of oxygen from $P_xO_{1+3x}$. The solid electrolyte according to the present embodiment has a deficit of atoms constituting coordination polyhedra and/or a deficit of magnesium atoms, and thus can exhibit a high conductivity.

In the general formula mentioned above, the composition ratio x of magnesium satisfies $0<x\leq3$. Consequently, the solid electrolyte can have a deficit of magnesium atoms. This deficit allows magnesium ions to easily move, thereby increasing the magnesium ionic conductivity in the solid electrolyte. Also, the solid electrolyte may partially include a magnesium oxide layer. In this case, $0<x\leq3.5$ is satisfied. Owing to the presence of this magnesium oxide layer, a space though which magnesium ions pass can be broadened. Note that it is predicted in the case where magnesium oxide is contained at a composition ratio of ½ mol to $Mg_3(PO_4)_2$ of 1 mol, x=3.5 is satisfied. Containing magnesium oxide exceeding ½ mol to $Mg_3(PO_4)_2$ of 1 mol might degrade the magnesium ionic conductivity. Accordingly, an appropriate content of magnesium oxide is ½ mol or less.

In addition, zirconium may be added within a range where $0\leq y<1.5$ is satisfied in the above-mentioned general formula. This stabilizes the structure of the solid electrolyte, thereby exhibiting a high stability against temperature variation. Also, a sufficient carrier density of magnesium ions is achieved, and accordingly the solid electrolyte can have excellent magnesium ionic conduction properties. Addition of zirconium causes substitution of zirconium ions for part of magnesium ions. Instead of such a substitution, zirconium oxide ($ZrO_2$) may alternatively be partially contained in the solid electrolyte.

In the above general formula, the composition ratio z of oxygen satisfies $3\leq z\leq 4$. Consequently, the solid electrolyte can have a deficit of oxygen atoms. This deficit weakens an electrostatic attractive force applied by oxygen ions to magnesium ions, thereby improving the magnesium ionic conductivity in the solid electrolyte.

The composition ratio z may further satisfy $4<z\leq4.25$. Oxygen does not necessarily need to constitute an octahedron composed of six-coordinate oxygen ions surrounding a phosphorus atom. For example, part of oxygen may form magnesium oxide. Thus, a sufficient amount of oxygen deficits is achieved and conversion of solid electrolyte to be amorphous can be easily controlled. Consequently, the solid electrolyte can have excellent magnesium ionic conduction properties, and the magnesium ionic conductivity in the solid electrolyte can be improved. Note that it is predicted in the case where magnesium oxide is contained at a composition ratio of ½ mol to $Mg_3(PO_4)_2$ of 1 mol, z=4.25 is satisfied. Containing magnesium oxide exceeding ½ mol in $Mg_3(PO_4)_2$ of 1 mol might degrade the magnesium ionic conductivity. Accordingly, an appropriate content of magnesium oxide is ½ mol or less.

As clarified above, the solid electrolyte according to the present embodiment may have a composition represented by $Mg_x(PO_z)_2$ ($3\leq x\leq 3.5$ and $3\leq z\leq 4.25$). This composition can sufficiently improve the magnesium ionic conductivity.

Also, the solid electrolyte according to the present embodiment may have a composition represented by $Mg_xZr_y(PO_z)_2$ ($0<x<3.5$, $0<y<1.5$, and $3\leq z\leq 4.25$). This composition can improve the structural stability of the magnesium phosphate.

The solid electrolyte includes an amorphous part. This broadens the distance between atoms and/or ions constituting the solid electrolyte. Thus, a space where magnesium ions can move is broadened, thereby further reducing an electrostatic attractive force applied to magnesium ions given from surrounding ions. Consequently, the solid electrolyte can exhibit excellent magnesium ionic conduction properties.

Owing to including the amorphous part, the solid electrolyte can be formed in the form of thin film. A film thickness of the solid electrolyte may be, for example, 100 nm or more and 20 μm or less, or may be 2 μm or less. This can reduce the resistance to magnesium ionic conduction while suppressing the occurrence of pinholes in the solid electrolyte.

1-2. Solid Electrolyte Manufacturing Method

The solid electrolyte according to the present embodiment can be formed by, for example, a physical deposition method or a chemical deposition method. Examples of the physical deposition method include sputtering method, vacuum deposition method, ion plating method, and pulsed laser deposition (PLD) method. Examples of the chemical deposition method include atomic layer deposition (ALD) method, chemical vapor deposition (CVD) method, liquid phase deposition method, sol-gel method, metallo-organic decomposition (MOD) method, spray pyrolysis deposition (SPD) method, doctor blading method, spin coating method, and printing techniques. Examples of the CVD method include plasma CVD method, thermal CVD method, and laser CVD method. The liquid phase deposition method is for example wet plating, and examples of the wet plating include electrolytic plating, immersion plating, and electroless plating. Examples of the printing techniques include inkjet printing and screen printing. However, the method of forming the solid electrolyte is not limited to these methods.

1-3. Secondary Battery

An example of the secondary battery according to the present embodiment will be described using FIG. 1. FIG. 1 is a cross-sectional view schematically showing a structural example of the secondary battery 10 according to the present embodiment.

The secondary battery 10 includes a substrate 11, a positive electrode current collector 12, a positive electrode 13, a solid electrolyte 14, a negative electrode 15, and a negative electrode current collector 16. The solid electrolyte 14 only needs to be disposed between the positive electrode 13 and the negative electrode 15, and an intermediate layer may be disposed therebetween. Magnesium ions can move between the positive electrode 13 and the negative electrode 15 through the solid electrolyte 14.

The substrate 11 may be either an electrically-insulating substrate or an electrically-conductive substrate. The substrate 11 may be any substrate that does not transform when an inorganic layer or an organic layer is formed thereon. Examples of the substrate 11 include a glass substrate, a plastic substrate, a polymer film, a silicon substrate, a metal plate, a metal foil sheet, and a laminate thereof. The substrate 11 may be a commercially available one or may be manufactured by a known method.

The positive electrode current collector 12 is composed of an electronic conductor that causes no chemical change with an ionic conductor contained in the positive electrode 13, within a range of an operating voltage of the secondary battery 10. An operating voltage of the positive electrode current collector 12 against the standard redox potential of magnesium may be for example within a range of +2.5 V to +4.5 V. The positive electrode current collector 12 is made of for example a metal or an alloy. More specifically, the positive electrode current collector 12 may be made of a metal or an alloy including at least one metal element selected from the group consisting of copper, chromium, nickel, titanium, platinum, gold, aluminum, tungsten, iron, and molybdenum. The positive electrode current collector 12 may be made of, for example, aluminum, an aluminum alloy, platinum, or gold, from the viewpoint of the electrical conductivity, the resistance to ionic conductors, and the redox potential.

The positive electrode current collector 12 may be formed from a transparent electrically-conductive film. Examples of the transparent electrically-conductive film include films of indium tin oxide (ITO), indium zinc oxide (IZO), fluorine-doped tin oxide (FTO), antimony-doped tin oxide (ATO), indium oxide ($In_2O_3$), tin oxide ($SnO_2$), and Al-containing ZnO.

The positive electrode current collector 12 may be a laminated film obtained by laminating the above-mentioned metal and/or transparent electrically-conductive film.

The positive electrode 13 contains a positive electrode active material that can occlude and release magnesium ions. Examples of the positive electrode active material include metal oxides, polyanion salt compounds, sulfides, chalcogenide compounds, and hydrides. Examples of the metal oxides include transition metal oxides and magnesium complex oxides. Examples of the transition metal oxides include $V_2O_5$, $MnO_2$, and $MoO_3$. Examples of the magnesium complex oxides include $MgCoO_2$ and $MgNiO_2$. Examples of the polyanion salt compounds include $MgCoSiO_4$, $MgMnSiO_4$, $MgFeSiO_4$, $MgNiSiO_4$, $MgCo_2O_4$, and $MgMn_2O_4$. Examples of the sulfides include $Mo_6S_8$. Examples of the chalcogenide compounds include $Mo_9Se_{11}$.

The positive electrode active material is for example crystalline. The positive electrode 13 may contain two or more types of positive electrode active materials.

The positive electrode 13 may include an electrically-conductive material and/or a binding material, as needed.

The electrically-conductive material may be any electron-conductive material and is not particularly limited. Examples of the electrically-conductive material include carbon materials, metals, and electrically-conductive polymers. Examples of the carbon materials include graphites, acetylene black, carbon black, ketjen black, carbon whisker, needle coke, and carbon fibers. Examples of the graphites include natural graphites and artificial graphites. Examples of the natural graphites include vein graphite and flake graphite. Examples of the metals include copper, nickel, aluminum, silver, and gold. These materials may be used alone or as a mixture of two or more types thereof. The electrically-conductive material may be, for example, carbon black or acetylene black, from the viewpoint of the electron conductivity and the coating properties.

The binding material may be any material that plays a role of binding active material particles and electrically-conductive material particles, and is not particularly limited. Examples of the binding material include fluorine-containing resins, thermoplastic resins, ethylene propylene diene monomer (EPDM) rubber, sulfonated EPDM rubber, and natural butyl rubber (NBR). Examples of the fluorine-containing resins include polytetrafluoroethylene (PTFE), polyvinylidene fluoride (PVdF), and fluororubber. Examples of the thermoplastic resins include polypropylene and polyethylene. These materials may be used alone or as a mixture of two or more types thereof. The binding material may be, for example, an aqueous dispersion of cellulose or styrene-butadiene rubber (SBR).

Examples of solvents for dispersing the positive electrode active material, the electrically-conductive material, and the binding material include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. The solvent may be for example a dispersant to which a thickener is added. Examples of the thickener include carboxymethyl cellulose and methyl cellulose.

The positive electrode 13 is formed for example as follows. First, a positive electrode active material, an electrically-conductive material, and a binding material are mixed together. Subsequently, an appropriate solvent is added to this mixture thereby to obtain a positive electrode material in the form of paste. Subsequently, this positive electrode material is applied onto a surface of a positive electrode current collector, followed by drying. As a result, a positive electrode 13 is obtained. Note that the positive electrode material may be compressed for increasing the electrode density.

The positive electrode 13 may be in the form of thin film. A film thickness of such a positive electrode 13 may be for example 500 nm or more and 20 μm or less.

Since the solid electrolyte 14 is the above-described solid electrolyte, description thereof is omitted.

The negative electrode 15 contains a negative electrode active material that can occlude and release magnesium ions. Examples of the negative electrode active material include metals, alloys, sulfides, carbon, organic compounds, inorganic compounds, metal complexes, and organic polymer compounds. Examples of the metals include magnesium, tin, bismuth, and antimony. Examples of the alloys include an alloy of magnesium with at least one selected from aluminum, silicon, gallium, zinc, tin, manganese, bismuth, and antimony.

The negative electrode 15 may contain two or more types of negative electrode active materials.

The negative electrode 15 may include an electrically-conductive material and/or a binding material, as needed. In the negative electrode 15, the electrically-conductive material, the binding material, the solvent, and the thickener described on the positive electrode 13 can be appropriately used.

The negative electrode 15 may be in the form of thin film. A film thickness of such a negative electrode 15 may be for example 500 nm or more and 20 µm or less.

The negative electrode current collector 16 is composed of an electronic conductor that causes no chemical change with an ionic conductor contained in the negative electrode 15, within the range of the operating voltage of the secondary battery 10. The operating voltage of the negative electrode current collector 16 against the standard redox potential of magnesium may be for example within a range of 0 V to +1.5 V. In the negative electrode current collector 16, the materials described on the positive electrode current collector 12 can be appropriately used.

The positive electrode current collector 12, the positive electrode 13, the solid electrolyte 14, the negative electrode 15, and the negative electrode current collector 16 each can be formed by the chemical deposition method or the physical deposition method mentioned above.

When viewed in plan, the secondary battery 10 may for example have a rectangular, circular, elliptic, or hexagonal shape. The secondary battery 10 may have a cylindrical, square, button-like, coin-like, or flat structure.

Solid electrolytes according to various embodiments and methods of manufacturing the solid electrolytes will be exemplified below. Materials, compositions, film thicknesses, shapes, characteristics, steps of manufacturing methods, and the order of the steps described in the present disclosure are for exemplification only. A plurality of steps of the manufacturing methods may be performed simultaneously or in different periods.

2. Manufacturing Device

Figure 2:
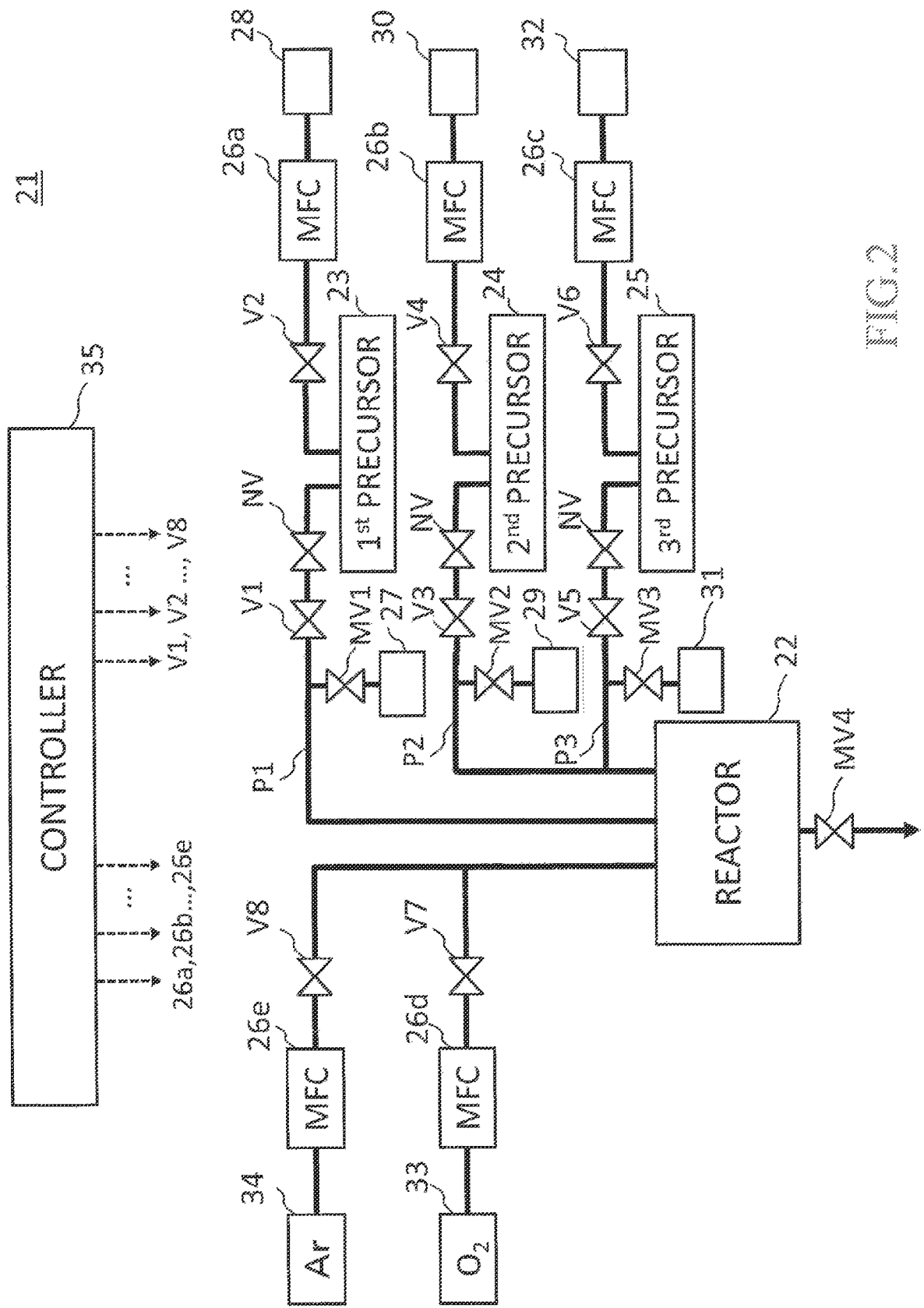
FIG. 2 shows a structural example of a reactor for manufacturing a solid electrolyte according to an embodiment of the present disclosure.

FIG. 2 shows a structural example of a manufacturing device 21 for forming a solid electrolyte film according to an embodiment by ALD method. The manufacturing device 21 includes a reactor 22, a controller 35, a first precursor supply unit 23, a second precursor supply unit 24, a third precursor supply unit 25, an oxygen supply unit 33, and a purge gas supply unit 34.

The reactor 22 is for example a process chamber.

The first precursor supply unit 23 supplies a first precursor into the reactor 22. The first precursor contains magnesium. The first precursor supply unit 23 is for example a bottle containing the first precursor.

The second precursor supply unit 24 supplies a second precursor into the reactor 22. The second precursor contains phosphorus constituting phosphoric acid. The second precursor supply unit 24 is for example a bottle containing the second precursor.

The third precursor supply unit 25 supplies a third precursor into the reactor 22. The third precursor contains zirconium. The third precursor supply unit 25 is for example a bottle containing the third precursor.

The manufacturing device 21 includes a first pipe P1 extending from the first precursor supply unit 23 to the reactor 22, a second pipe P2 extending from the second precursor supply unit 24 to the reactor 22, and a third pipe P3 extending from the third precursor supply unit 25 to the reactor 22.

The oxygen supply unit 33 supplies any or any combination of an oxygen gas, an $H_2O$ gas, and an ozone gas into the reactor 22. The purge gas supply unit 34 supplies a purge gas into the reactor 22 thereby to purge a residual gas in the reactor 22 and also adjust a degree of vacuum in the reactor 22.

The manufacturing device 21 shown in FIG. 2 further includes auxiliary gas supply units 27 to 32, mass flow controllers 26a to 26e, valves V1 to V8, manual valves MV1 to MV3, and a needle valve NV.

The controller 35 for example controls the valves V1 to V8 and the mass flow controllers 26a to 26e. The controller 35 for example includes a memory and a processor. The controller 35 further includes, for example, a semiconductor device, a semiconductor integrated circuit (IC), and a large scale integration (LSI), or an electronic circuit which is a combination of the semiconductor device, the IC, and the LSI. The LSI or the IC may be integrated in a single chip or may be a combination of a plurality of chips. For example, each functional block may be integrated in a single chip. The LSI or the IC may be called, for example, a system LSI, a very large scale integration (VLSI), or an ultra large scale integration (UVLSI), depending on the degree of integration.

A commercially available product may be applied to the manufacturing device 21, depending on the type of a target solid electrolyte film. Examples of commercially available manufacturing devices include Savannah Systems, Fiji Systems, and Phoenix Systems (manufactured by Ultratech/Cambridge NanoTech), ALD-series (manufactured by SHOWA SHINKU CO., LTD.), TFS 200, TFS 500, TFS 120P400A, P800, and the like (manufactured by Beneq), OpAL and FlexAL (manufactured by Oxford Instruments), InPassion ALD 4, InPassion ALD 6, and InPassion ALD 8 (manufactured by SoLay Tec), AT-400 ALD System (manufactured by Anric Technologies), and LabNano and LabNano-PE (manufactured by Ensure NanoTech). In the case where the commercially available product is applied to the manufacturing device 21, for example, a program for executing various flows described below is stored in the memory included in the controller 35 and is executed by the processor included in the controller 35, thereby achieving the manufacturing device 21 according to the present embodiment.

3. Manufacturing Method

The following describes, as an example of a method of manufacturing the solid electrolyte film according to the present embodiment, a manufacturing method using the manufacturing device 21. Note that the solid electrolyte film and the method of manufacturing the solid electrolyte film in the present disclosure are not limited to a specific manufacturing device. Each step of the manufacturing method in the present disclosure may be performed in accordance with a predetermined program stored in a manufacturing device or may be performed by manual operations of a manufacturing device.

3-1. Overall Flow

Figure 3A:
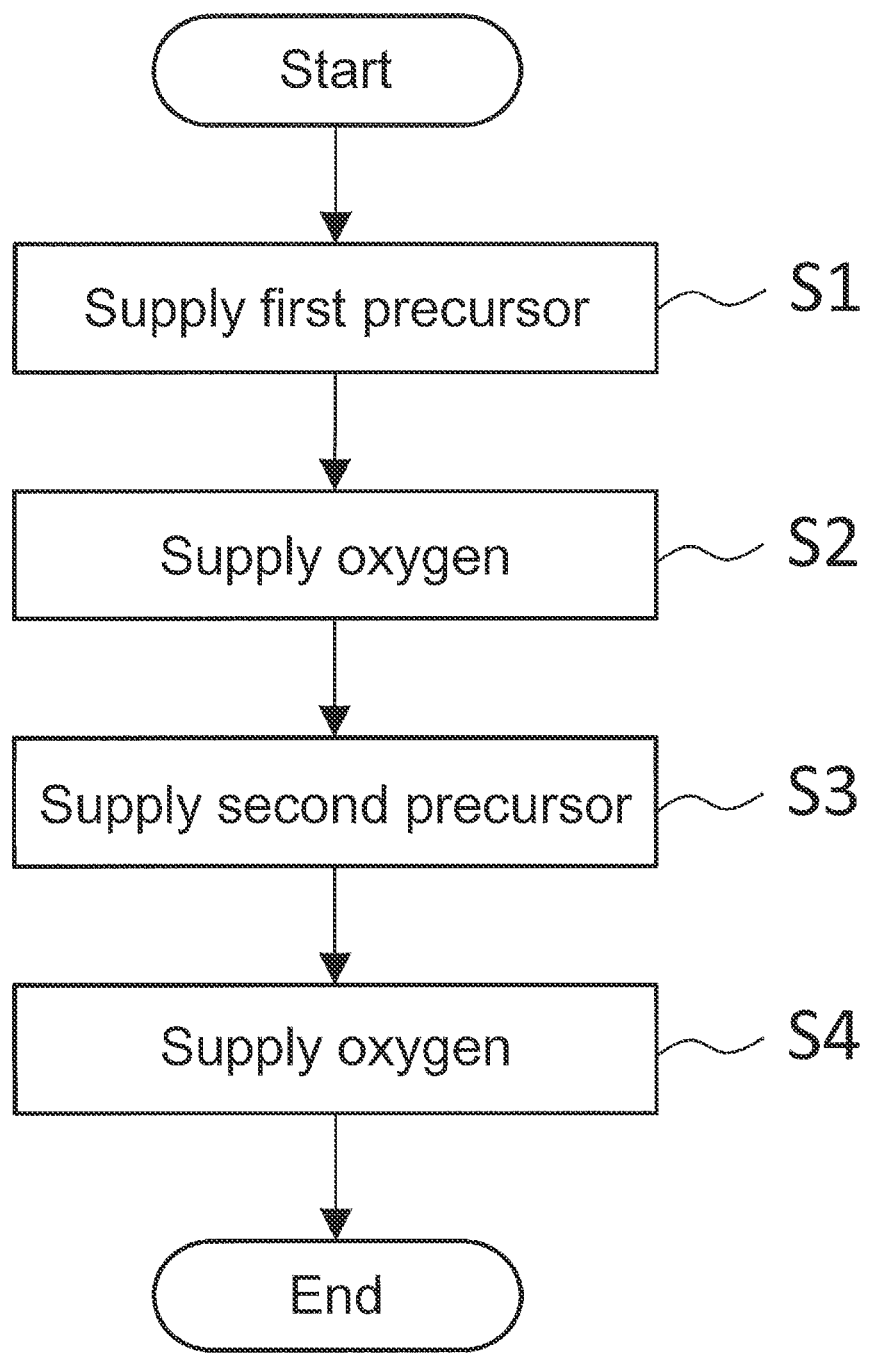
FIG. 3A is a flowchart showing an example of a method of manufacturing the solid electrolyte according to the embodiment of the present disclosure.

FIG. 3A is a flowchart showing an example of a method of manufacturing the solid electrolyte film according to the embodiment. The manufacturing method shown in FIG. 3A includes: Step S1 of supplying the first precursor containing magnesium into the reactor 22; Step S2 of supplying any or any combination of an oxygen gas, an $H_2O$ gas, and an ozone gas into the reactor 22; Step S3 of supplying the second precursor containing phosphorus into the reactor 22; and further Step S4 of supplying any or any combination of an oxygen gas, an $H_2O$ gas, and an ozone gas into the reactor 22. This manufacturing method further includes, for example, a step of supplying a purge gas into the reactor 22. In oxygen supply in Steps S2 and S4, the respective gases may be converted to plasmas.

The order, timings, the number of performances of each step are not particularly limited. For example, the flow shown in FIG. 3A may be repeatedly performed. For example, a plurality of steps may be simultaneously performed. For example, Step S1 is performed at least once prior to Step S2 or S4. For example, Steps S1 and S3 are performed in different periods.

According to the order shown in FIG. 3A, the first precursor is oxidized in Step S2. Consequently, magnesium oxide is obtained. In Step S3, a precursor containing phosphorus is bonded onto the magnesium oxide. In Step S4, the phosphorus precursor is oxidized. Consequently, a solid electrolyte film is obtained.

Note that Step S2 may be omitted such that the precursors supplied in Steps S1 and Step S3 are simultaneously oxidized in Step S4.

3-2. Preparation

Prior to the start of solid electrolyte film manufacturing, a substrate is disposed inside the reactor 22.

The substrate is made of, for example, metal, metal oxide, resin, glass, or ceramics. The metal may be for example Au. The metal oxide may be for example metal composite oxide. Examples of the resin include polyester, polycarbonate, fluorine resin, and acrylic resin. Examples of the glass include soda-lime glass, and quartz glass. Examples of the ceramics include aluminum oxide, silicon, gallium nitride, sapphire, and silicon carbide. For example, a thermally-oxidized film ($SiO_2$) having a film thickness of 400 nm may be formed on an Si substrate.

A temperature inside the reactor 22 is not particularly limited, and may be 100° C. or more and 500° C. or less, or may be 120° C. or more and 300° C. or less. Setting of the temperature inside the reactor 22 to 500° C. or less allows the film formation to proceed satisfactorily. In the case where the first precursor and/or the second precursor includes carbon, setting of the temperature inside the reactor 22 to 100° C. or more allows the precursor to be appropriately oxidized.

3-3. First Precursor Supply

In Step S1, the first precursor including magnesium is supplied into the reactor 22. For example, in FIG. 2, the valve V1 is opened to supply the first precursor from the first precursor supply unit 23 to the reactor 22.

A temperature of the first precursor supply unit 23 is not particularly limited, and may be 50° C. or more and 190° C. or less in the case where the first precursor has a low vapor pressure.

In Step S1, the manual valve MV1 may be opened to supply an auxiliary gas from the auxiliary gas supply unit 27 toward the reactor 22. The auxiliary gas sweeps, to the reactor 22, the first precursor released from the first precursor supply unit 23 into the first pipe P1. A flow rate of the auxiliary gas is not particularly limited, and may be 20 ml/min or more and 60 ml/min or less, or may be 30 ml/min or more and 55 ml/min or less.

In Step S1, the valve V2 may be opened to supply an auxiliary gas from the auxiliary gas supply unit 28 toward the reactor 22, depending on the type of the first precursor. The auxiliary gas sweeps the first precursor to the reactor 22. A flow rate of this auxiliary gas can be controlled by the mass flow controller 26a. The flow rate of this auxiliary gas is not particularly limited, and may be 1 ml/min or more and 30 ml/min or less, or may be 5 ml/min or more and 20 ml/min or less.

Temperatures of the auxiliary gases supplied from the auxiliary gas supply units 27 and 28 are not particularly limited, and may be 50° C. or more and 300° C. or less, or may be 100° C. or more and 280° C. or less.

In Step S1, the needle valve NV may be adjusted to control the flow rate of the first precursor. An opening degree of the needle valve NV is for example 10% to 60%.

The auxiliary gases supplied from the auxiliary gas supply units 27 and 28 may be the same as those exemplified in the description of Step S1.

The first precursor is not particularly limited, and is, for example, bis(cyclopentadienyl)magnesium ($Cp_2Mg$), bis(methylcyclopentadienyl)magnesium ($MeCp_2Mg$), or bis(ethylcyclopentadienyl)magnesium ($EtCp_2Mg$). These materials may be used alone or as a mixture of two or more types thereof.

Step S1 ends by closing the valve V1. A duration of Step S1 corresponds, for example, to a period from the open to the close of the valve V1. The duration of Step S1 is not particularly limited, and may be approximately 0.01 seconds or more and 10 seconds or less, may be approximately 0.05 seconds or more and 8 seconds or less, or may be approximately 0.1 seconds or more and 5 seconds or less.

3-4. Oxygen Supply

In Step S2, any or any combination of an oxygen gas, an $H_2O$ gas, and an ozone gas is supplied into the reactor 22. For example, referring to FIG. 2, the valve V7 is opened to supply any or any combination of an oxygen gas, an $H_2O$ gas, and an ozone gas from the oxygen supply unit 33 into the reactor 22.

The oxygen gas and the $H_2O$ gas may contain for example oxygen radical generated by plasma treatment. Plasma ALD can increase reactivity and further lower a system temperature.

The ozone gas may be generated by for example supplying an oxygen gas to an OT-020 ozone generator (manufactured by Ozone Technology).

A flow rate of the any or any combination of the oxygen gas, the $H_2O$ gas, and the ozone gas is controlled by the mass flow controller 26d, and may be, for example, 20 ml/min to 60 ml/min, or may be 30 ml/min to 50 ml/min. A concentration of the any or any combination of the oxygen gas, the $H_2O$ gas, and the ozone gas is not particularly limited, and may be for example 100%. A temperature of the any or any combination of the oxygen gas, the $H_2O$ gas, and the ozone gas is not particularly limited, and may be, for example, 50° C. or more and 300° C. or less, or may be 100° C. or more and 280° C. or less.

Step S2 ends by closing the valve V7. A duration of Step S2 corresponds to a period from the open to the close of the valve V7. The duration of Step S2 is not particularly limited, and may be approximately 0.1 seconds to 15 seconds, may be approximately 0.2 seconds to 10 seconds, or may be approximately 0.2 seconds to 8 seconds.

3-5. Second Precursor Supply

In Step S3, the second precursor containing network formers is supplied into the reactor 22. For example, in FIG. 2, the valve V3 is opened to supply the second precursor from the second precursor supply unit 24 into the reactor 22.

A temperature of the second precursor supply unit 24 is not particularly limited. In the case where the second precursor has a low vapor pressure, the temperature of the second precursor supply unit 24 may be 1° C. or more and 60° C. or less, or may be 5° C. or more and 50° C. or less.

In Step S3, a manual valve MV2 may be opened to supply an auxiliary gas from the auxiliary gas supply unit 29 toward the reactor 22. The auxiliary gas sweeps, to the reactor 22, the second precursor released from the second precursor supply unit 24 into the second pipe P2. A flow rate of this auxiliary gas is not particularly limited, and may be 20 ml/min or more and 60 ml/min or less, or may be 25 ml/min or more and 50 ml/min or less. In Step S3, the opening degree of the needle valve NV may be adjusted to control a flow rate of the second precursor. The opening degree of the needle valve NV is for example 10% to 60%.

In Step S3, the valve V4 may be opened to supply an auxiliary gas from the auxiliary gas supply unit 30 toward the reactor 22, depending on the type of the second precursor. The auxiliary gas sweeps the second precursor to the reactor 22. A flow rate of this auxiliary gas can be controlled by the mass flow controller 26b. Temperatures of the auxiliary gases supplied from the auxiliary gas supply units 29 and 30 are not particularly limited, and may be 100° C. or more and 300° C. or less, or may be 120° C. or more and 280° C. or less.

The auxiliary gas is for example an inert gas. Examples of the inert gas include an argon gas and a nitrogen gas. The auxiliary gas may be one type of gas or a mixture of two or more types of gases.

Network formers mean atoms or an atomic group (i.e., radical) that can form a network structure by directly or indirectly bonding each other or that have already formed a network structure. This network structure constitutes a framework of oxide. A network former may be, for example, part of molecules constituting the second precursor, and other part of the molecules may be separated in formation of the network structure. The network former contains phosphorus.

The second precursor is not particularly limited, and is for example a phosphorus compound. Examples of the phosphorus compound include tris(dimethylamino)phosphine (TDMAP), trimethylphosphine (TMP), triethylphosphine (TEP), and tert-butylphosphine (TBP). These materials may be used alone or as a mixture of two or more types thereof.

Step S3 ends by closing the valve V3. A duration of Step S3 is not particularly limited, and may be approximately 0.01 seconds or more and 10 seconds or less, may be approximately 0.05 seconds or more and 8 seconds or less, or may be approximately 0.1 seconds or more and 5 seconds or less.

3-6. Oxygen Supply

In Step S4, any or any combination of an oxygen gas, an $H_2O$ gas, and an ozone gas is supplied into the reactor 22. Step S4 is the same as Step S2 in terms of gas type and method, and accordingly description thereof is omitted.

3-7. Purge Gas Supply

In Steps S11 to S14 of purge gas supply, a purge gas is supplied into the reactor 22 thereby to purge a residual gas in the reactor 22. For example, in FIG. 2, the valve V8 is opened to supply the purge gas from the purge gas supply unit 34 into the reactor 22.

A flow rate of the purge gas is controlled by the mass flow controller 26e, and may be, for example, 20 ml/min or more and 60 ml/min or less, or may be 30 ml/min or more 50 ml/min or less. A temperature of the purge gas is not particularly limited, and may be 100° C. or more and 300° C. or less, or may be 120° C. or more and 280° C. or less.

The purging step such as Steps S11 to S14 may be performed for example each time each of Steps S1 to S4 is completed. Alternatively, the purging step such as Steps S11 to S14 may be performed each time any specific of Steps S1 to S4 is completed. Alternatively, the purging step such as Steps S11 to S14 may be performed simultaneously with at least one of Steps S1 to S4. For example, in order to sufficiently exhaust gases from the reactor 22, the purging step may be continuously performed as a background process from the start to the end of solid electrolyte film formation.

A duration of each of the purging Steps S11 to S14 is not particularly limited, and may be approximately 0.1 seconds to 60 seconds, or may be approximately 5 seconds to 30 seconds.

The purge gas is for example an inert gas. The inert gas is for example an argon gas and/or a nitrogen gas. The purge gas may be one type of gas or a mixture of two or more types of gases.

3-8. Degree of Vacuum in Reactor and Temperatures of Pipes

In the method of manufacturing the solid electrolyte film according to the present embodiment, the degree of vacuum in the reactor 22 may be controlled. For example, in FIG. 2, the degree of vacuum in the reactor 22 can be controlled by adjusting an opening degree of the manual valve MV4 for exhaustion.

The degree of vacuum can be set depending on the type of solid electrolyte films, and may be, for example, 0.1 Torr or more and 8.0 Torr or less, or may be 0.5 Torr or more and 5.0 Torr or less. Setting of the degree of vacuum to 0.1 Torr or more for example allows the first precursor to be continuously supplied into the reactor 22, thereby sufficiently oxidizing the first precursor. Thus, in the case for example where the first precursor contains carbons, an amount of carbons in the solid electrolyte film can be reduced owing to sufficient oxidization. Setting of the degree of vacuum to 8.0 Torr or less for example allows a supply amount of the second precursor to be appropriately controlled. The degree of vacuum in the reactor can be measured by for example using Pirani gauge (TPR280 DN16 ISO-KF: manufactured by Pfeiffer Vacuum).

In the method of manufacturing the solid electrolyte film according to the present embodiment, temperatures of the pipes may be set for example as follows.

For example, in FIG. 2, the temperature of the first pipe P1 and the temperature of the second pipe P2 are set to be higher than a boiling point or a sublimation temperature of the first precursor and to be higher than a boiling point or a sublimation temperature of the second precursor. In the case for example where the first precursor is bis(ethylcyclopentadienyl)magnesium, its boiling point is approximately 65° C. In the case where the second precursor is tris(dimethylamino)phosphine, its boiling point is approximately 48° C. to 50° C.

For example, the temperature of the first pipe P1 and the temperature of the second pipe P2 are higher than the temperature of the first precursor supply unit 23 and higher than the temperature of the second precursor supply unit 24. This can suppress solidification of the first precursor inside the first pipe P1 and suppress solidification of the second precursor inside the second pipe P2.

The temperature of the first pipe P1 and the temperature of the second pipe P2 may be higher than the temperature of the first precursor supply unit 23 by 55° C. or more and higher than the temperature of the second precursor supply unit 24 by 55° C. or more. The temperature of the first pipe P1 and the temperature of the second pipe P2 may be higher than the temperature of the first precursor supply unit 23 by 60° C. or more and higher than the temperature of the second precursor supply unit 24 by 60° C. or more.

In the case for example where the temperature of the first precursor supply unit 23 is 60° C. and the temperature of the second precursor supply unit 24 is 40° C., the respective temperatures of the first pipe P1 and the second pipe P2 may be set to approximately 180° C.

3-9. Method of Manufacturing Magnesium Phosphate Film

Figure 3B:
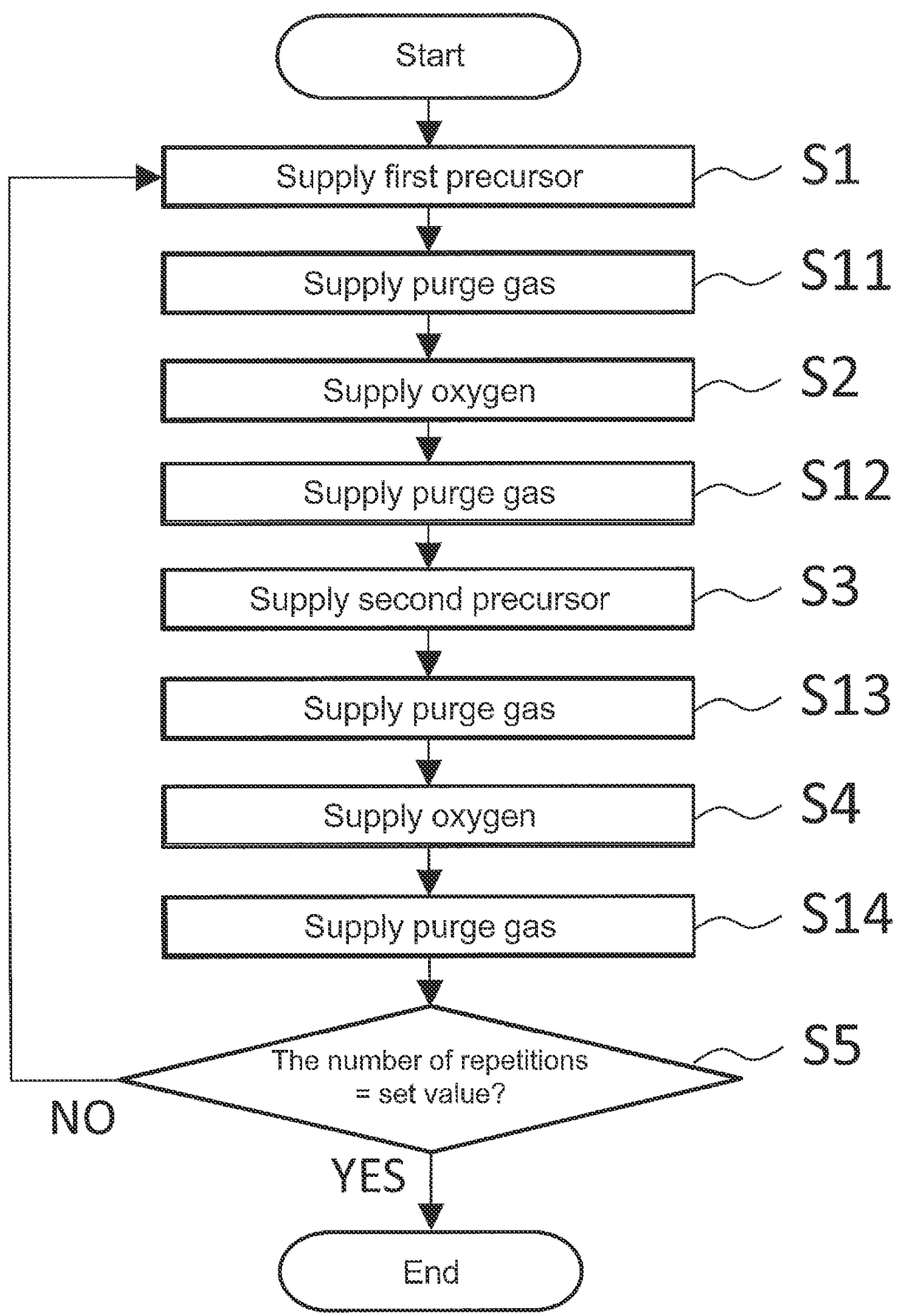
FIG. 3B is a flowchart showing another example of a method of manufacturing the solid electrolyte according to the embodiment of the present disclosure.

FIG. 3B is a flowchart showing an example of a method of manufacturing the solid electrolyte film according to the embodiment. The manufacturing method shown in FIG. 3B includes: Step S1 of supplying the first precursor into the reactor 22; Step S2 of supplying an oxygen gas, an $H_2O$ gas, and an ozone gas or any combination thereof into the reactor 22; Step S3 of supplying the second precursor into the reactor 22; Step S4 of supplying an oxygen gas, an $H_2O$ gas, and an ozone gas or any combination thereof into the reactor 22; Steps S11 to S14 of supplying a purge gas into the reactor 22; and Step S5 of determining whether the number of repetitions has reached a predetermined set value. Thus, a cycle including Steps S1 to S5 and Steps S11 to S14 is repeated a plurality of times. For FIG. 3B, some of the description given with reference to FIG. 3A will be omitted.

According to the manufacturing method shown in FIG. 3B, after Steps S1 to S4 are completed, the purging Steps S11 to S14 are performed, respectively.

In the example shown in FIG. 3B, in Step S5, it is determined as to whether the number of repetitions has reached the set value. Then, in the case where the number of repetitions has not reached the predetermined set value (Step S5: NO), the cycle returns to Step S1. In the case where the number of repetitions has reached the predetermined set value (Step S5: YES), the solid electrolyte film formation ends.

The number of cycle repetitions is not particularly limited, and may be appropriately set depending on for example a film thickness of a target solid electrolyte film and the types of the first precursor and the second precursor. The number of cycle repetitions may be, for example, approximately 2 to 8000, or may be approximately 5 to 3000. In the case for example where the film thickness of the solid electrolyte film is set to approximately 500 nm, the number of cycle repetitions may be set to 1000 to 3000. Alternatively, in the case where the film thickness of the solid electrolyte film is set to 50 nm or less, the number of cycle repetitions may be set to 300 or less.

The film thickness of the solid electrolyte film according to the present embodiment is not particularly limited. The thickness of the solid electrolyte film may be, for example, 5 μm or less, 2 μm or less, 550 nm or less, or 300 nm or less. The thickness of the solid electrolyte film may be, for example, 200 nm or less, 150 nm or less, 110 nm or less, 100 nm or less, or 50 nm or less. The lower limit for the film thickness of the solid electrolyte film is not particularly limited, and may be 0.1 nm or 1 nm.

In the example shown in FIG. 3B, Steps S1 to S4 are each performed once in one cycle. Note that the number of times each step is performed in one cycle is not limited to this. Also, the number of times and timings of each purging step are not limited to the example shown in FIG. 3B.

Determination as to whether to continue or end the solid electrolyte film formation may be performed under conditions different from the number of repetitions. For example, the solid electrolyte film formation may end on the basis that an elapsed period reaches a predetermined value or on the basis that the film thickness of the solid electrolyte film reaches a predetermined value.

The composition ratio of each of the elements of the solid electrolyte film can be controlled for example in accordance with the flow rate of the first precursor, a pulse duration of the first precursor, the flow rate of the second precursor, a pulse duration of the second precursor, and a pulse duration of the purge gas. The composition ratio of each of the elements of the solid electrolyte film may be controlled by for example setting an amount of a precursor having the lowest vapor pressure and setting the flow rates and the pulse durations of other elements with reference to the set amount of the precursor.

Figure 3C:
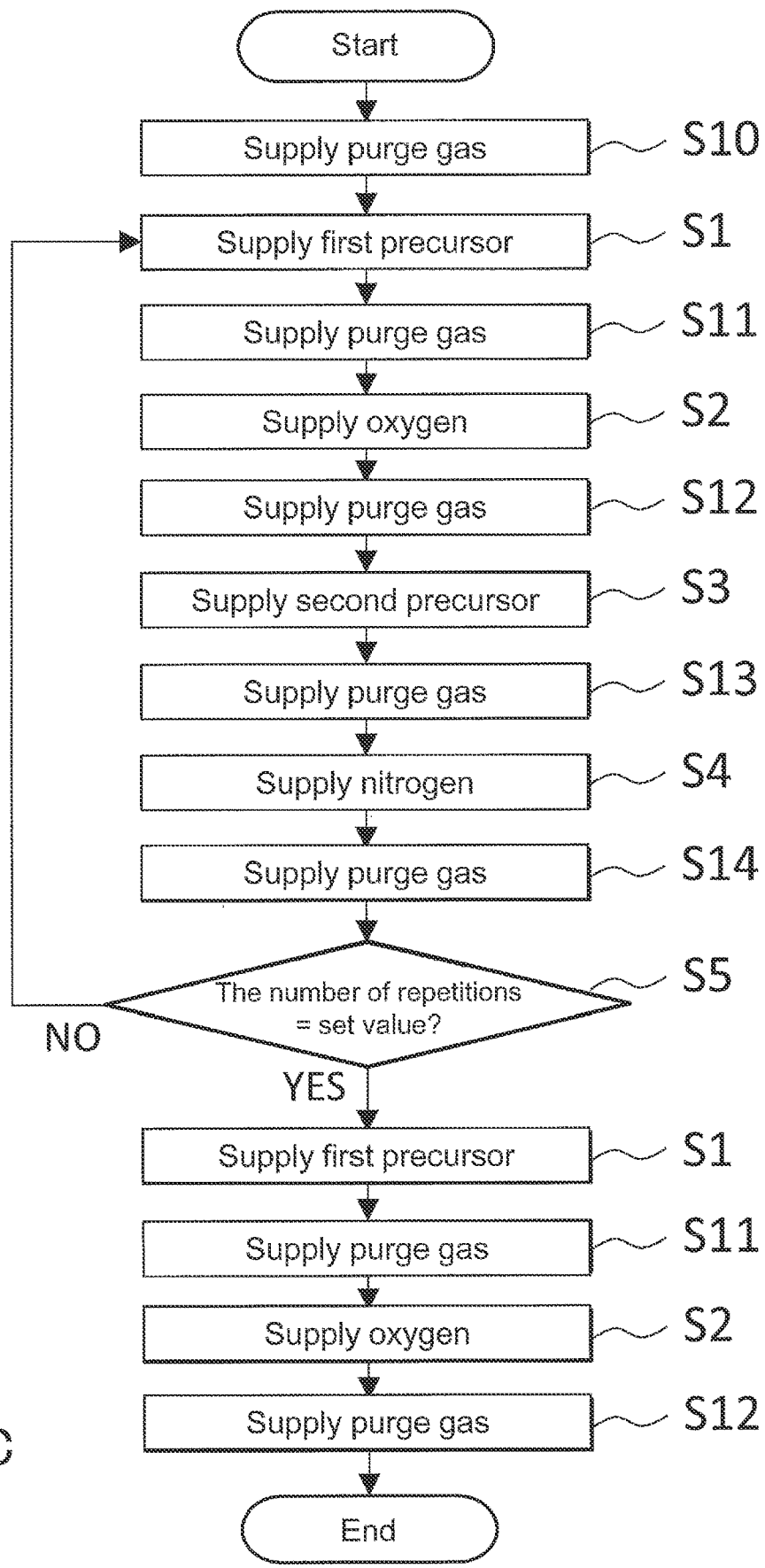
FIG. 3C is a flowchart showing another example of a method of manufacturing the solid electrolyte according to the embodiment of the present disclosure.

Furthermore, as shown in FIG. 3C, Steps S1 to S12 may be performed after the number of repetitions has reached the set value in Step S5.

Figure 3D:
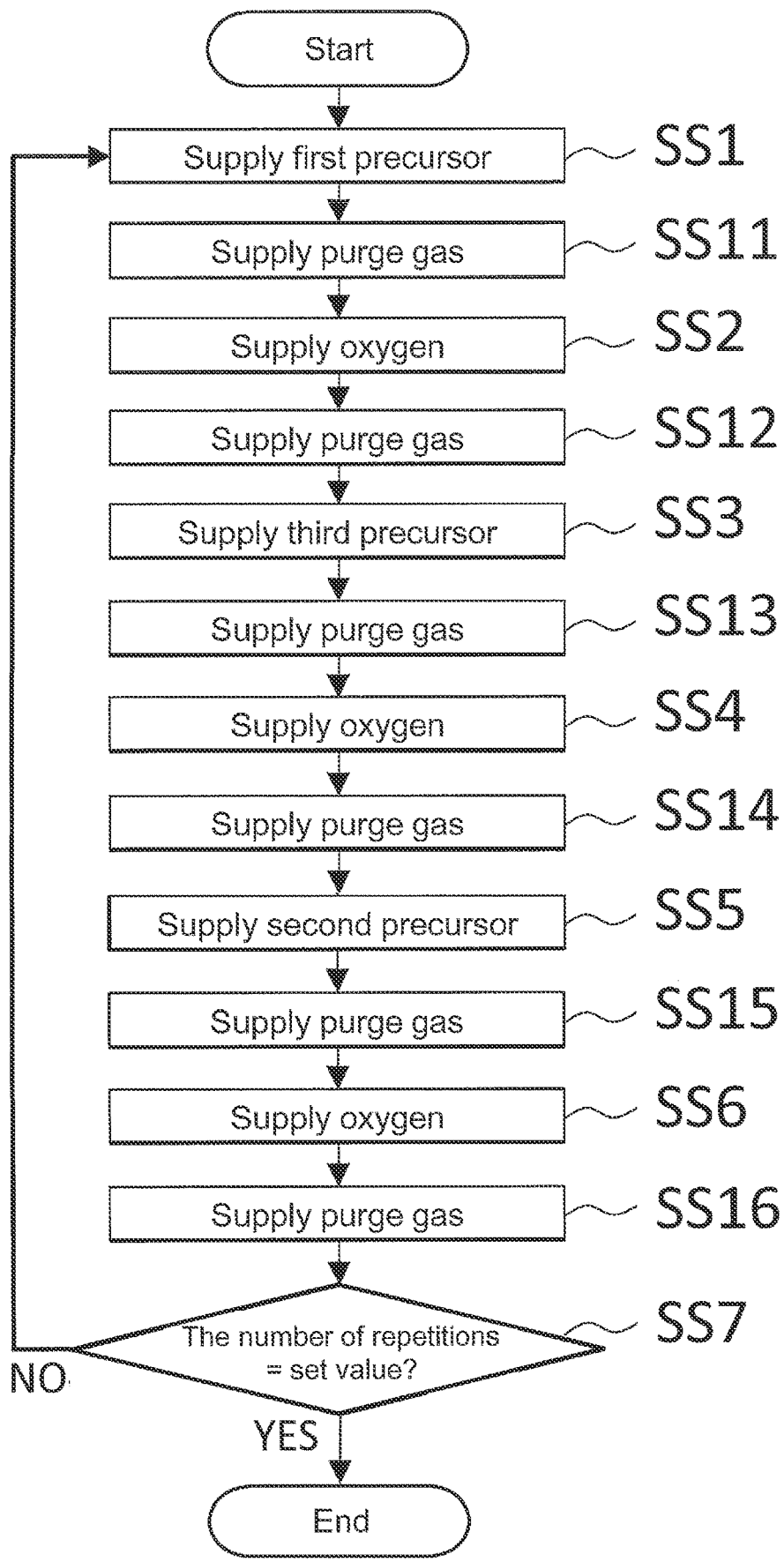
FIG. 3D is a flowchart showing another example of a method of manufacturing the solid electrolyte according to the embodiment of the present disclosure.

3-10. Method of Manufacturing Magnesium Phosphate Film to which Zirconium is Added FIG. 3D is a flowchart showing an example of a method of manufacturing the solid electrolyte film according to the embodiment. In the manufacturing method shown in FIG. 3D, description is given of an example of a method of manufacturing a magnesium phosphate film to which zirconium is added as the solid electrolyte film. For FIG. 3D, some of the description given with reference to FIG. 3A to FIG. 3C will be omitted.

The steps other than Step SS3 of supplying the third precursor are the same as those described in FIG. 3A to FIG. 3C, and accordingly Step SS3 of supplying the third precursor will be described.

In Step SS3, the third precursor including zirconium is supplied into the reactor 22. For example, referring to FIG. 2, the valve V5 is opened to supply the third precursor from the third precursor supply unit 25 to the reactor 22.

A temperature of the third precursor supply unit 25 is not particularly limited, and may be 50° C. or more and 190° C. or less in the case where the third precursor has a low vapor pressure.

In Step SS3, the manual valve MV3 may be opened to supply an auxiliary gas from an auxiliary gas supply unit 31 toward the reactor 22. The auxiliary gas sweeps, to the reactor 22, the third precursor released from the third precursor supply unit 25 into the third pipe P3. A flow rate of the auxiliary gas is not particularly limited, and may be 20 ml/min or more and 60 ml/min or less, or may be 30 ml/min or more and 55 ml/min or less.

In Step SS3, the valve V6 may be opened to supply the auxiliary gas from the auxiliary gas supply unit 32 toward the reactor 22, depending on the type of the third precursor. The auxiliary gas sweeps the third precursor to the reactor 22. The flow rate of this auxiliary gas can be controlled by the mass flow controller 26c. The flow rate of this auxiliary gas is not particularly limited, and may be 1 ml/min or more and 30 ml/min or less, or may be 5 ml/min or more and 20 ml/min or less.

Temperatures of the auxiliary gases supplied from the auxiliary gas supply units 31 and 32 are not particularly limited, and may be 50° C. or more and 300° C. or less, or may be 100° C. or more and 280° C. or less.

In Step SS3, the opening degree of the needle valve NV may be adjusted to control the flow rate of the third precursor. The opening degree of the needle valve NV is for example 10% to 60%.

The auxiliary gases supplied from the auxiliary gas supply units 31 and 32 may be the same as those exemplified in the description of Step S1.

The third precursor is not particularly limited, and is, for example, tetrabutoxyzirconium, tetrakisethylmethylaminozirconium, or tetraethoxyzirconium. These materials may be used alone or as a mixture of two or more types thereof.

Step SS3 ends by closing the valve V5. A duration of Step SS3 corresponds, for example, to a period from the open to the close of the valve V5. The duration of Step SS3 is not particularly limited, and may be approximately 0.01 seconds or more and 10 seconds or less, may be approximately 0.05 seconds or more and 8 seconds or less, or may be approximately 0.1 seconds or more and 5 seconds or less.

FIG. 3D is a flowchart showing an example of a method of manufacturing the solid electrolyte film according to the embodiment. The manufacturing method shown in FIG. 3D includes: Step SS1 of supplying the first precursor into the reactor 22; Step SS2 of supplying an oxygen gas, an $H_2O$ gas, and an ozone gas or any combination thereof into the reactor 22; Step SS3 of supplying the third precursor into the reactor 22; Step SS4 of supplying an oxygen gas, an $H_2O$ gas, and an ozone gas or any combination thereof into the reactor 22; Step SS5 of supplying the second precursor into the reactor 22; Step SS6 of supplying an oxygen gas, an $H_2O$ gas, and an ozone gas or any combination thereof into the reactor 22; Steps SS11 to SS16 of supplying purge gas into the reactor 22; and Step SS7 of determining whether the number of repetitions has reached a predetermined set value. Consequently, a cycle including Steps SS1 to SS7 and Steps SS11 to S16 is repeated a plurality of times. For FIG. 3D, some of the description given with reference to FIG. 3A to FIG. 3C will be omitted.

According to the manufacturing method shown in FIG. 3D, after Steps SS1 to SS6 are completed, the purging Steps SS11 to SS16 are performed, respectively.

In the example shown in FIG. 3D, in Step SS7, it is determined as to whether the number of repetitions has reached the set value. Then, in the case where the number of repetitions has not reached the predetermined set value (Step SST NO), the cycle returns to Step SS1. In the case where the number of repetitions has reached the predetermined set value (Step SST YES), the solid electrolyte film formation ends.

The number of cycle repetitions is not particularly limited, and may be appropriately set depending, for example, on a film thickness of a target solid electrolyte film and the types of the first to the third precursors. The number of cycle repetitions may be, for example, approximately 2 to 8000, or may be approximately 5 to 3000. In the case for example where the film thickness of the solid electrolyte film is set to approximately 500 nm, the number of cycle repetitions may be set to 1000 to 3000. Alternatively, in the case where the film thickness of the solid electrolyte film is set to 50 nm or less, the number of cycle repetitions may be set to 300 or less.

The film thickness of the solid electrolyte film according to the present embodiment is not particularly limited. The thickness of the solid electrolyte film may be, for example, 5 μm or less, 2 μm or less, 550 nm or less, or 300 nm or less. The thickness of the solid electrolyte film may be, for example, 200 nm or less, 150 nm or less, 110 nm or less, 100 nm or less, or 50 nm or less. The lower limit for the film thickness of the solid electrolyte film is not particularly limited, and may be 0.1 nm or 1 nm.

In the example shown in FIG. 3D, Steps SS1 to SS6 are each performed once in one cycle. Note that the number of times each step is performed in one cycle is not limited to this. Also, the number of times and timings of each purging step are not limited to the example shown in FIG. 3D.

Determination as to whether to continue or end the solid electrolyte film formation may be made under conditions different from the number of repetitions. For example, the solid electrolyte film formation may end when an elapsed period reaches a predetermined value or when the film thickness of the solid electrolyte film reaches a predetermined value.

The composition ratio of each of the elements of the solid electrolyte film can be controlled for example in accordance with the flow rate of the first precursor, a pulse duration of the first precursor, the flow rate of the second precursor, a pulse duration of the second precursor, the flow rate of the third precursor, a pulse duration of the third precursor, and a pulse duration of the purge gas. The composition ratio of each of the elements of the solid electrolyte film may be controlled by for example setting an amount of a precursor having the lowest vapor pressure and setting the flow rates and the pulse durations of other elements with reference to the set amount of the precursor.

Furthermore, similarly to FIG. 3C, after the number of repetitions has reached the set value in Step SS7, Steps SS1 to SS12 or Steps SS1 to SS14 may be performed.

Temperature settings of the pipes and the precursor supply units may be as follows. In the case for example where the respective temperatures of the first precursor supply unit 23, the second precursor supply unit 24, and the third precursor supply unit 25 are 60° C., 40° C., and 50° C., respectively, the respective temperatures of the first pipe P1, the second pipe P2, and the third pipe P3 may be set to approximately 180° C.

4. Solid Electrolyte Film

A structural example of the solid electrolyte film according to the present embodiment will be described. Note that the solid electrolyte film according to the present embodiment may be manufactured by for example the above manufacturing method.

The solid electrolyte film according to the present embodiment includes network formers containing phosphorus and magnesium.

The solid electrolyte film according to the present embodiment has an amorphous structure, and is characterized by having no specific peak indicating a crystal growth in an analysis by an X-ray diffractometer (XRD). This broadens a space though which magnesium ions pass, improving the magnesium ionic conductivity.

Furthermore, the solid electrolyte film according to the present embodiment may include zirconium in addition to network formers containing phosphorus and magnesium. This improves the material stability, thermal decomposition or decomposition due to voltage application.

4-1. Secondary Battery

The solid electrolyte film according to the present embodiment can be utilized as a solid electrolyte of a secondary battery. For example, the secondary battery according to the present embodiment includes a positive electrode, a negative electrode, a solid electrolyte containing the above-mentioned oxynitride. The positive electrode includes a positive electrode current collector and a positive electrode active material. The negative electrode includes a negative electrode current collector and a negative electrode active material.

The secondary battery may be for example an all-solid-state secondary battery. In this case, the solid electrolyte film may be sandwiched between the positive electrode and the negative electrode. Voltage application between the positive electrode and the negative electrode generates ionic conductivity in the solid electrolyte film. Materials of the positive and negative electrode current collectors may be any electrically-conductive material. The electrically-conductive material is for example metal, such as Au, Pt, Al, Ag, Cu, Mg, Ni, Ti, or Fe. The electrically-conductive material may be an alloy including at least one type of the above metals. Examples of the alloy include an Au—Mg alloy, a Ca—Mg alloy, a Mg—Ni alloy, a Ca—Ni alloy, a Mg—Zn alloy, and an Al—Mg alloy.

The solid electrolyte included in the secondary battery may be a solid electrolyte film only or a laminate obtained by laminating a solid electrolyte film and another film. Examples of the other film include sulfide films and halide films. The solid electrolyte does not need to be in the form of film and may be for example in the form of powder. Accordingly, the description of the "solid electrolyte film" in the present embodiment can be appropriately read as description of "oxide".

In the present embodiment, a covering material for an electrode active material of a magnesium secondary battery is a material for covering an electrode active material. The covering material for an electrode active material of a magnesium secondary battery has a solid electrolyte including magnesium phosphate or magnesium phosphate to which zirconium is added, represented by the above general formula. This can prevent decomposition of an electrolyte solution due to electron transfer on contact surfaces between an electrode and the electrolyte solution.

The positive electrode may have an irregular surface, and the solid electrolyte may be a coat covering the irregular surface. The negative electrode may have an irregular surface, and the solid electrolyte may be a coat covering the irregular surface. Thus, a contact area between the electrode and the solid electrolyte can be increased, thereby activating reaction between the electrode and the solid electrolyte. The solid electrolyte coat is formed by for example the above-mentioned ALD so as to have a conformal shape conform to the irregular surface. Consequently, a solid electrolyte with less process variation can be formed. At least one of the positive electrode and the negative electrode may have for example a porous shape, and the solid electrolyte may have a shape conform to the irregular surface caused by the porous shape.

For example, the positive electrode active material may consist of active material particles, and the solid electrolyte may be coats covering surfaces of the respective active material particles. The negative electrode active material may consist of active material particles, and the solid electrolyte may be coats covering surfaces of the respective active material particles. Thus, a contact area between the active material and the solid electrolyte can be increased, thereby activating reaction between the active material and the solid electrolyte. For example, according to the above-mentioned ALD, a source gas can flow between the active material particles in each step and thus solid electrolyte coats covering the surfaces of the respective particles can be formed.

Alternatively, the solid electrolyte may be formed on the positive electrode current collector or the negative electrode current collector.

The secondary battery according to the present embodiment is not limited to an all-solid-state secondary battery. The secondary battery may for example have an electrolyte solution in addition to the solid electrolyte.

Magnesium has a standard electrode potential of −2.36 V. This value is more noble than the standard electrode potential, −3.05 V, of lithium. Accordingly, an electrolyte solution of magnesium ion secondary batteries is required to have a higher resistance to oxidation than an electrolyte solution of conventional lithium ion secondary batteries. For example, a charging potential of 4.00 V on the magnesium basis corresponds to a charging potential of 4.69 V on the lithium basis. This charging potential is so high to cause oxidative decomposition of the electrolyte solution of conventional lithium ion secondary batteries. Accordingly, in the case where the charging potential of a positive electrode on the magnesium basis exceeds 4 V, the electrolyte solution of the magnesium ion secondary batteries is required to have a higher resistance to oxidation beyond an assumable range in the conventional lithium ion secondary batteries. However, such a requirement is satisfied by few electrolyte solutions of magnesium ion secondary batteries. There has been no report of an electrolyte solution that satisfies such a requirement particularly when the potential of a positive electrode exceeds 4 V during charging.

The present inventors focused on decomposition of an electrolyte solution due to electron transfer between a positive electrode and the electrolyte solution and/or between a negative electrode and the electrolyte solution, and arrived at a secondary battery described below.

(Drawings and Term Definition)

The present disclosure is described with reference to the drawings relating to specific embodiments, but the present disclosure is not limited thereto and is limited only by the claims. The drawings are merely schematic and non-limiting. In the drawings, the sizes and shapes of some components may be exaggerated or drawn with different scales for illustrative purposes. The dimensions and relative dimensions do not necessarily correspond to actual implementation of the present disclosure.

In the present disclosure, the terms "first" and "second" are used not for describing the temporal or spatial order but for distinguishing similar components from each other. Accordingly, the terms "first" and "second" are appropriately exchangeable.

In the present disclosure, the terms such as "top" and "bottom" are used for illustrative purposes and do not necessarily describe relative positions. These terms are exchangeable under appropriate circumstances, and various embodiments are operatable in a direction other than those described or illustrated herein.

In the present disclosure, an expression "X disposed on Y" means that X and Y are in contact with each other, and does not limit the relative positional relation between X and Y to a specific direction.

Among the components described in the present disclosure, components that are not recited in the independent claims representing the broadest concept are described as optional ones.

First Embodiment 4-2. Structure of Magnesium Secondary Battery Using Electrolyte Solution FIG. 4 is a schematic cross-sectional view showing a structure of a secondary battery 1000 according to a first embodiment.

The secondary battery 1000 includes a positive electrode 100, a negative electrode 200, an electrolyte solution 300, and a solid electrolyte layer 400. The negative electrode 200 and the positive electrode 100 are electrically separated from each other and face each other with a gap therebetween. The solid electrolyte layer 400 covers the positive electrode 100. The electrolyte solution 300 fills a space between the positive electrode 100 and the negative electrode 200. The secondary battery 1000 charges and discharges owing to magnesium ions moving between the positive electrode 100 and the negative electrode 200.

The secondary battery 1000 may further include for example a separator (not illustrated) separating the solid electrolyte layer 400 and the negative electrode 200 from each other. In this case, the electrolyte solution 300 may be impregnated inside the separator.

Figure 4:
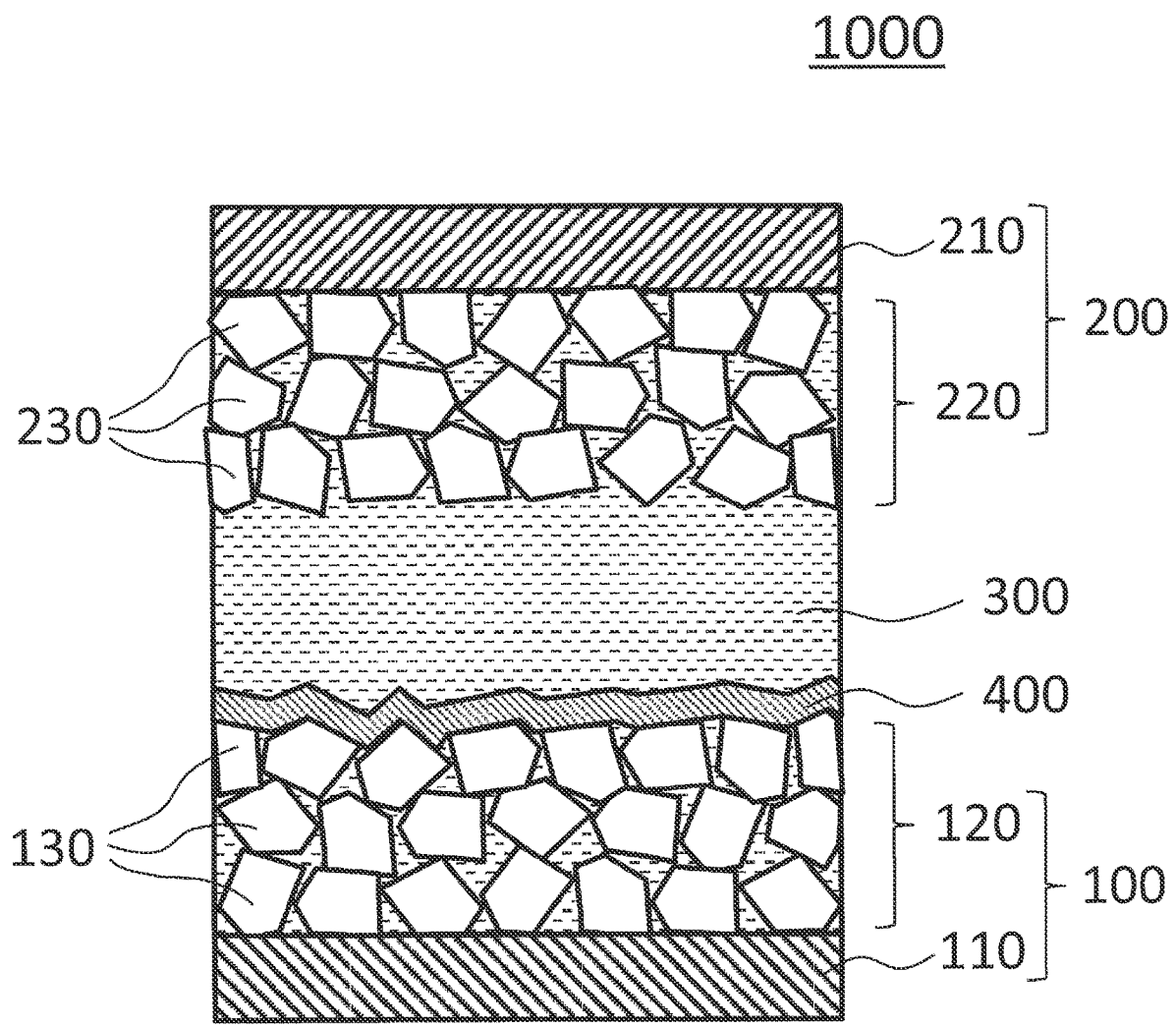
FIG. 4 is a cross-sectional view schematically showing a structural example of a secondary battery according to a first embodiment.

The shape of the secondary battery 1000 is not limited to the example shown in FIG. 4, and may be, for example, sheet-like, coin-like, button-like, laminated, cylindrical, flat, or square.

4-3. Positive Electrode

The positive electrode 100 includes a positive electrode current collector 110 and a positive electrode active material layer 120. The positive electrode active material layer 120 is disposed on the positive electrode current collector 110, and includes positive electrode active material particles 130. In other words, the positive electrode active material particles 130 are disposed on the positive electrode current collector 110. A top surface of the positive electrode active material layer 120 is an irregular surface defined by the positive electrode active material particles 130.

The positive electrode current collector 110 is for example a metal sheet or a metal film. The positive electrode current collector 110 may be porous or nonporous. Example of the metal materials include aluminum, an aluminum alloy, stainless steel, titanium, and a titanium alloy. A carbon material such as carbons may be applied onto the surface of the positive electrode current collector 110. Alternatively, the positive electrode current collector 110 may be a transparent electrically-conductive film. Examples of the transparent electrically-conductive film include indium tin oxide (ITO), indium zinc oxide (IZO), fluorine-doped tin oxide (FTO), antimony-doped tin oxide (ATO), indium oxide ($In_2O_3$), tin oxide ($SnO_2$), and Al-containing zinc oxide.

The positive electrode active material particles 130 are, for example, metal oxides containing magnesium and transition metal, metal sulfides containing magnesium and transition metal, polyanion salts containing magnesium and transition metal, or fluorine polyanion salts containing magnesium and transition metal. The transition metal is for example selected from Mn, Co, Cr, V, Ni and Fe. These materials can occlude and release magnesium ions.

Examples of the materials of the positive electrode active material particles 130 include $MgM_2O_4$ (where M is at least one type selected from Mn, Co, Cr, Ni and Fe), $MgMO_2$ (where M is at least one type selected from Mn, Co, Cr, Ni and Al), $MgMSiO_4$ (where M is at least one type selected from Mn, Co, Ni and Fe), and $Mg_xM_yAO_zF_w$ (where M is a transition metal, Sn, Sb, or In, A is P, Si, or S, $0<x\leq2$, $0.5\leq y\leq1.5$, z is 3 or 4, and $0.5\leq w\leq1.5$).

Note that the positive electrode active material particles 130 are not limited to the above materials, and for example do not need to include magnesium. For example, the positive electrode active material particles 130 may be graphite fluoride, metal oxide, or metal halide. The metal oxide or the metal halide may for example contain at least one type selected from scandium, titanium, vanadium, chromium, manganese, iron, cobalt, nickel, copper, and zinc. For example, the positive electrode active material particles 130 may be sulfide such as $Mo_6S_8$ or chalcogenide compound such as $Mo_9Se_{11}$.

The positive electrode active material particles 130 may be for example a material having an electrode potential of more than +4 V with respect to magnesium metal. In this case, the secondary battery 1000 can achieve a capacity more than 4 V while suppressing oxidative decomposition of the electrolyte solution 300. Examples of such a material include $MgNiSiO_4$ and $MgCoSiO_4$.

As necessary, the positive electrode active material layer 120 may have added thereto an electrically-conductive material and/or a binding material, in addition to the above material. The electrically-conductive material and/or the binding material described in the above section [1-3. Secondary battery] can be appropriately used for the positive electrode active material layer 120.

The positive electrode 100 is formed for example as follows. First, the positive electrode active material particles 130, an electrically-conductive material, and a binding material are mixed together. Subsequently, an appropriate solvent is added to this mixture thereby to obtain a positive electrode composite material in the form of paste. Subsequently, this positive electrode composite material is applied onto the surface of the positive electrode current collector 110, followed by drying. As a result, the positive electrode 100 is obtained. Note that the dried positive electrode composite material may be rolled together with the positive electrode current collector 110 for the purpose of increasing the electrode density.

The positive electrode 100 may be in the form of thin film. A film thickness of such a positive electrode 100 may be for example 500 nm or more and 20 µm or less.

4-4. Negative Electrode

The negative electrode 200 includes a negative electrode current collector 210 and a negative electrode active material layer 220. The negative electrode active material layer 220 is disposed on the negative electrode current collector 210 and contains negative electrode active material particles 230. In other words, the negative electrode active material particles 230 are disposed on the negative electrode current collector 210. A bottom surface of the negative electrode active material layer 220 is an irregular surface defined by the negative electrode active material particles 230.

The negative electrode current collector 210 is for example a metal sheet or a metal film. The negative electrode current collector 210 may be porous or nonporous. Example of the metal materials include aluminum, an aluminum alloy, stainless steel, titanium, and a titanium alloy. A carbon material such as carbons may be applied onto the surface of the negative electrode current collector 210.

Examples of the negative electrode active material particles 230 include metal, carbon, metal oxide, carbon intercalation compound, and sulfide. The negative electrode active material particles 230 include for example magnesium metal or magnesium alloy. Alternatively, the negative electrode active material particles 230 may be a material that can occlude and release magnesium ions.

Examples of the negative electrode active material particles 230 include magnesium, tin, bismuth, antimony, a magnesium alloy. The magnesium alloy contains, for example, magnesium and at least one type selected from tin, bismuth, titanium, manganese, lead, antimony, aluminum, silicon, gallium, and zinc.

As necessary, the negative electrode active material layer 220 may have added thereto an electrically-conductive material and/or a binding material, in addition to the above material. The electrically-conductive material, the binding material, the solvent, and the thicker described on the positive electrode active material layer 120 can be appropriately used for the negative electrode active material layer 220.

The negative electrode 200 can be formed by the same method as the above-described method of forming the positive electrode 100.

The negative electrode 200 may be in the form of thin film. A film thickness of such a negative electrode 200 may be for example 500 nm or more and 20 µm or less.

4-5. Solid Electrolyte Layer

The solid electrolyte layer 400 covers the positive electrode active material layer 120. The solid electrolyte layer 400 includes a covering material for a positive electrode active material of a magnesium secondary battery. Thus, the solid electrolyte layer 400 separates the positive electrode active material layer 120 and the electrolyte solution 300 from each other, avoiding a direct contact between the positive electrode active material layer 120 and the electrolyte solution 300. This can prevent decomposition of the electrolyte solution due to electron transfer on contact surfaces between the positive electrode and the electrolyte solution.

More specifically, the solid electrolyte layer 400 is disposed on one principal surface of the positive electrode active material layer 120 including the positive electrode active material particles 130, and is a single layer collectively covering the positive electrode active material particles 130. In other words, the solid electrolyte layer 400 is a single layer covering the positive electrode active material layer 120. The solid electrolyte layer 400 is formed along an irregular surface defined by the positive electrode active material particles 130. The covering material for a positive electrode active material of a magnesium secondary battery covers the positive electrode active material layer 120 including the positive electrode active material particles 130, and thereby forms the solid electrolyte layer 400. In the present description, "solid electrolyte layer 400" is referred to also as "surface layer 400". The solid electrolyte layer 400 is an example of a surface layer provided on one principal surface of a positive electrode active material layer.

The positive electrode may further include the solid electrolyte layer 400. In this case, the positive electrode includes the positive electrode current collector 110 and a positive electrode layer. The positive electrode layer includes the positive electrode active material layer 120 including the positive electrode active material particles 130 and the solid electrolyte layer 400.

A method of manufacturing the solid electrolyte layer 400 may be for example the same as the method described in the above section [1-2. Solid electrolyte manufacturing method].

The solid electrolyte layer 400 may be in the form of powder or in the form of block. The solid electrolyte may include an amorphous part. A film thickness of the solid electrolyte layer 400 may be for example 1 nm or more and 50 nm or less. In the case where the solid electrolyte layer 400 includes an amorphous part, the solid electrolyte layer 400 is easily formed along the irregular surface of the positive electrode active material layer 120.

4-6. Electrolyte Solution

The electrolyte solution 300 fills a space between the positive electrode 100 and the negative electrode 200. Furthermore, the electrolyte solution 300 may fill gaps between the positive electrode active material particles 130, and may fill gaps between the negative electrode active material particles 230.

The electrolyte solution 300 is a liquid containing a nonaqueous solvent and a magnesium salt dissolved in the nonaqueous solvent, and can move magnesium ions depending on the electric field.

Examples of a material of the nonaqueous solvent include cyclic ethers, chain ethers, cyclic carbonate esters, chain carbonate esters, cyclic carboxylate esters, chain carboxylate esters, pyrocarbonic acid esters, phosphoric acid esters, boric acid esters, sulfuric acid esters, sulfurous esters, cyclic sulfones, chain sulfones, nitriles, and sultones.

Examples of the cyclic ethers include 1,3-dioxolane, 4-methyl-1,3-dioxolane, tetrahydrofuran, 2-methyltetrahydrofuran, propylene oxide, 1,2-butylene oxide, 1,4-dioxane, 1,3,5-trioxane, furan, 2-methylfuran, 1,8-cineol, and crown ethers, and derivatives thereof. Examples of the chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl, and derivatives thereof.

Examples of the cyclic carbonate esters include ethylene carbonate, propylene carbonate, butylene carbonate, vinylene carbonate, fluoroethylene carbonate, 4,5-difluoroethylene carbonate, 4,4,4-trifluoroethylene carbonate, fluoromethylethylene carbonate, trifluoromethylethylene carbonate, 4-fluoropropylene carbonate, and 5-fluoropropylene carbonate, and derivatives thereof. Examples of the chain carbonate esters include dimethyl carbonate, ethyl methyl carbonate, diethyl carbonate, methylpropyl carbonate, ethylpropyl carbonate, and methylisopropyl carbonate, and derivatives thereof.

Examples of the cyclic carboxylate esters γ-butyrolactone, γ-valerolactone, γ-caprolactone, ε-caprolactone, and α-acetolactone, and derivatives thereof. Examples of the chain carboxylate esters include methyl acetate, ethyl acetate, propyl acetate, butyl acetate, methylpropionate, ethylpropionate, propylpropionate, and butylpropionate, and derivatives thereof.

Examples of the pyrocarbonic acid esters include diethylpyrocarbonate, dimethyl pyrocarbonate, and di-tert-butyl dicarbonate, and derivatives thereof. Examples of the phosphoric acid esters include trimethyl phosphate, triethyl phosphate, and hexamethylphosphoramide, and derivatives thereof. Examples of the borates include trimethyl borate and triethyl boric acid esters, and derivatives thereof. Examples of the sulfuric acid esters include trimethyl sulfate, and triethyl sulfate, and derivatives thereof. Examples of the sulfurous esters include ethylene sulfite and derivatives thereof.

Examples of the cyclic sulfones include sulfolane and derivatives thereof. Examples of the chain sulfones include alkyl sulfone and derivatives thereof. Examples of the nitriles include acetonitrile, valeronitrile, propionitrile, trimethylacetonitrile, cyclopentanecarbonitrile, adiponitrile, pimelonitrile, and derivatives thereof. Examples of the sultones include 1,3-propane sultone and derivatives thereof.

Only one type or any combination of two or more types of the above-mentioned materials may be used as the solvent.

Examples of the magnesium salt include $MgBr_2$, $MgI_2$, $MgCl_2$, $Mg(AsF_6)_2$, $Mg(ClO_4)_2$, $Mg(PF_6)_2$, $Mg(BF_4)_2$, $Mg(CF_3SO_3)_2$, $Mg[N(CF_3SO_2)_2]_2$, $Mg(SbF_6)_2$, $Mg(SiF_6)_2$, $Mg[C(CF_3SO_2)_3]_2$, $Mg[N(FSO_2)_2]_2$, $Mg[N(C_2F_5SO_2)_2]_2$, $MgB_{10}Cl_{10}$, $MgB_{12}Cl_{12}$, $Mg[B(C_6F_5)_4]_2$, $Mg[B(C_6H_5)_4]_2$, $Mg[N(SO_2CF_2CF_3)_2]_2$, $Mg[BF_3C_2F_5]_2$, and $Mg[PF_3(CF_2CF_3)_3]_2$. Only one type or any combination of two or more types of these materials may be used as the magnesium salt.

The electrolyte solution 300 for example fills a space between the positive electrode 100 and the negative electrode 200 facing each other inside an external casing (not illustrated), and is impregnated in the positive electrode 100, the solid electrolyte layer 400, and the negative electrode 200.

4-7. Effects

Conventional secondary batteries having no solid electrolyte layer have, as described above, a risk of electrolyte solution decomposition due to electron transfer on contact surfaces between a positive electrode and an electrolyte solution. Meanwhile, the secondary battery 1000 has the solid electrolyte layer 400 covering the positive electrode 100. Owing to this, it is possible to suppress movement of electrons between the positive electrode 100 and the electrolyte solution 300 while allowing magnesium ions to move between the positive electrode 100 and the electrolyte solution 300. This can suppress decomposition of the electrolyte solution 300 while maintaining the electrical properties of the secondary battery 1000. As a result, the secondary battery 1000 can be stabilized and thus can have a prolonged operating life.

Note that the solid electrolyte layer 400 does not need to completely prevent the contact between the positive electrode 100 and the electrolyte solution 300, and for example only needs to reduce the contact area between the positive electrode 100 and the electrolyte solution 300 compared to a structure in which the solid electrolyte layer 400 is not provided.

In particular, in the case where the charging potential of the positive electrode 100 exceeds 4 V in charging of the secondary battery 1000, an action of suppressing decomposition of the electrolyte solution 300 operates more significantly. For example, it is possible to use, in the secondary battery 1000, a material of an electrolyte solution that has been recognized to be unusable in a region where the charging potential exceeds 4 V. For example, it is possible to adopt, as a nonaqueous solvent for high-capacity alkaline earth metal ion secondary batteries, a nonaqueous solvent that has been used for conventional lithium ion secondary batteries. Thus, the degree of freedom in selection of the material of the secondary battery 1000 is increased.

In the secondary battery 1000, the electrolyte solution 300 and the solid electrolyte layer 400 can function as an electrolyte. For example by adjusting a distance between the negative electrode 200 and the solid electrolyte layer 400 and the film thickness of the solid electrolyte layer 400, it is possible to cause the electrolyte solution 300 to function as a main component of the electrolyte. This can achieve a secondary battery having an electrolyte with excellent electrical properties for example compared to secondary batteries having an electrolyte that is entirely solid (namely, all-solid-state secondary batteries).

In the secondary battery 1000, a method of manufacturing the solid electrolyte layer 400 is easy for example compared to that of a surface layer 400c described later. Furthermore, in the case for example where the positive electrode active material layer 120 includes an electrically-conductive material, the solid electrolyte layer 400 can also cover the electrically-conductive material in addition to the positive electrode active material particles 130. Thus, the solid electrolyte layer 400 can also suppress reaction between the electrically-conductive material and the electrolyte solution 300.

Furthermore, in magnesium ion secondary batteries, contact of an electrolyte solution with a positive electrode might cause precipitation of a magnesium compound (for example magnesium oxide) on contact surfaces between the electrolyte solution and the positive electrode. This precipitate is a passive film and hinders movement of magnesium ions between the positive electrode and the electrolyte solution. Thus, magnesium ion secondary batteries have a risk of being prevented by the precipitated passive film from performing charge and discharge operations.

Note that lithium ion secondary batteries do not have this problem caused by a passive film. According to lithium-ion secondary batteries as well, precipitation of a lithium compound is known. However, this precipitate is ionic conductive, and accordingly does not hinder movement of lithium ions.

Thus, in the case where the secondary battery 1000 is a magnesium ion secondary battery, the solid electrolyte layer 400 covers the positive electrode 100 thereby to suppress passive film generation on the positive electrode 100. This can achieve stable charge and discharge operations of the secondary battery 1000.

5. Various Modifications 5-1. Modification 1

Figure 5:
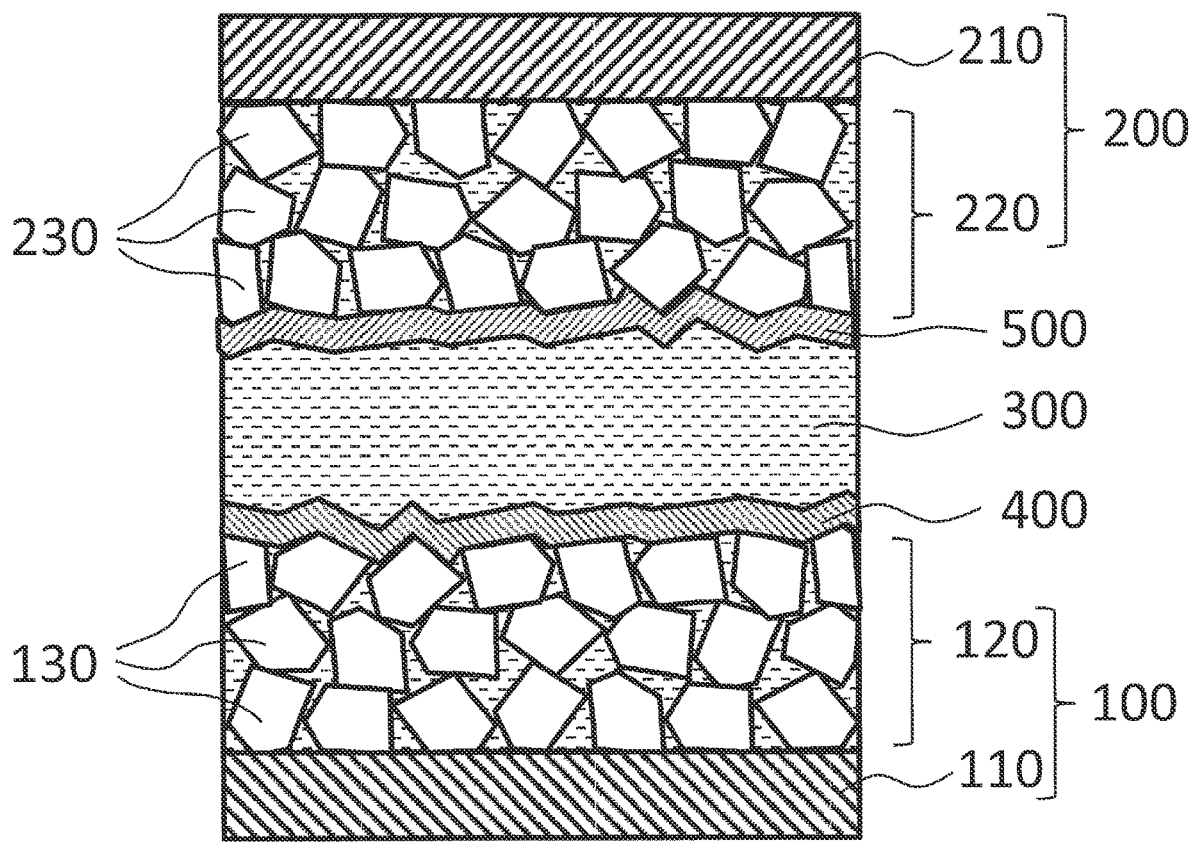
FIG. 5 is a cross-sectional view schematically showing Modification 1 of the secondary battery according to the first embodiment.

FIG. 5 is a schematic cross-sectional view showing a structure of a secondary battery 1000a as Modification 1 of the secondary battery according to the first embodiment.

The secondary battery 1000a includes a positive electrode 100, a negative electrode 200, an electrolyte solution 300, a solid electrolyte layer 400, and a solid electrolyte layer 500. The solid electrolyte layer 500 covers the negative electrode 200. Components of the secondary battery 1000a excluding the solid electrolyte layer 500 are the same as corresponding those of the secondary battery 1000, and accordingly description thereof is omitted.

The solid electrolyte layer 500 covers the negative electrode active material layer 220. The solid electrolyte layer 500 includes a covering material for a negative electrode active material of a magnesium secondary battery. Thus, the solid electrolyte layer 500 separates the negative electrode active material layer 220 and the electrolyte solution 300 from each other, avoiding a direct contact between the negative electrode active material layer 220 and the electrolyte solution 300. This can prevent decomposition of the electrolyte solution due to electron transfer on contact surfaces between the negative electrode and the electrolyte solution.

The solid electrolyte layer 500 is disposed on one principal surface of the negative electrode active material layer 220 including the negative electrode active material particles 230, and is a single layer collectively covering the negative electrode active material particles 230. In other words, the solid electrolyte layer 500 is a single layer covering the negative electrode active material layer 220. The solid electrolyte layer 500 is formed along an irregular surface defined by the negative electrode active material particles 230. The covering material for a negative electrode active material of a magnesium secondary battery covers the negative electrode active material layer 220 including the negative electrode active material particles 230, and thereby forms the solid electrolyte layer 500. In the present description, "solid electrolyte layer 500" is referred to also as "surface layer 500". The solid electrolyte layer 500 is an example of a surface layer provided on one of principal surfaces of a negative electrode active material layer.

The negative electrode 200 includes a negative electrode current collector 210 and a negative electrode active material layer 220. The negative electrode active material layer 220 is disposed on the negative electrode current collector 210, and includes negative electrode active material particles 230. In other words, the negative electrode active material particles 230 are disposed on the negative electrode current collector 210. A top surface of the negative electrode active material layer 220 is an irregular surface defined by the negative electrode active material particles 230. The negative electrode may further include the solid electrolyte layer 500. In this case, the negative electrode includes the negative electrode current collector 210 and a negative electrode layer. The negative electrode layer includes the negative electrode active material layer 220 including the negative electrode active material particles 230 and the solid electrolyte layer 500.

A method of manufacturing the solid electrolyte layer 500 may be for example the same as the method described in the above section [1-2. Solid electrolyte manufacturing method].

The solid electrolyte layer 500 may be in the form of powder or in the form of block. The solid electrolyte may include an amorphous part. A film thickness of the solid electrolyte layer 500 may be, for example, 1 nm or more and 20 nm or less, or may be 5 nm or more and 50 nm or less. In the case where the solid electrolyte layer 500 includes an amorphous part, the solid electrolyte layer 500 is easily formed along the irregular surface of the negative electrode active material layer 220.

The secondary battery 1000a exhibits effects arising from the solid electrolyte layer 500, in addition to the various effects described in the above section [4-7. Effects]. The effects arising from the solid electrolyte layer 500 can be comprehended by appropriately replacing, in the description in the above section [4-7. Effects], the "positive electrode current collector 110", the "solid electrolyte layer 400", and the "positive electrode 100" with the "negative electrode current collector 210", the "solid electrolyte layer 500", and the "negative electrode 200", respectively. Briefly speaking, the solid electrolyte layer 500 can suppress reductive decomposition of the electrolyte solution 300 by suppressing the contact between the negative electrode 200 and the electrolyte solution 300. Also, the solid electrolyte layer 500 can suppress passive film generation on the negative electrode 200.

5-2. Modification 2

Figure 6:
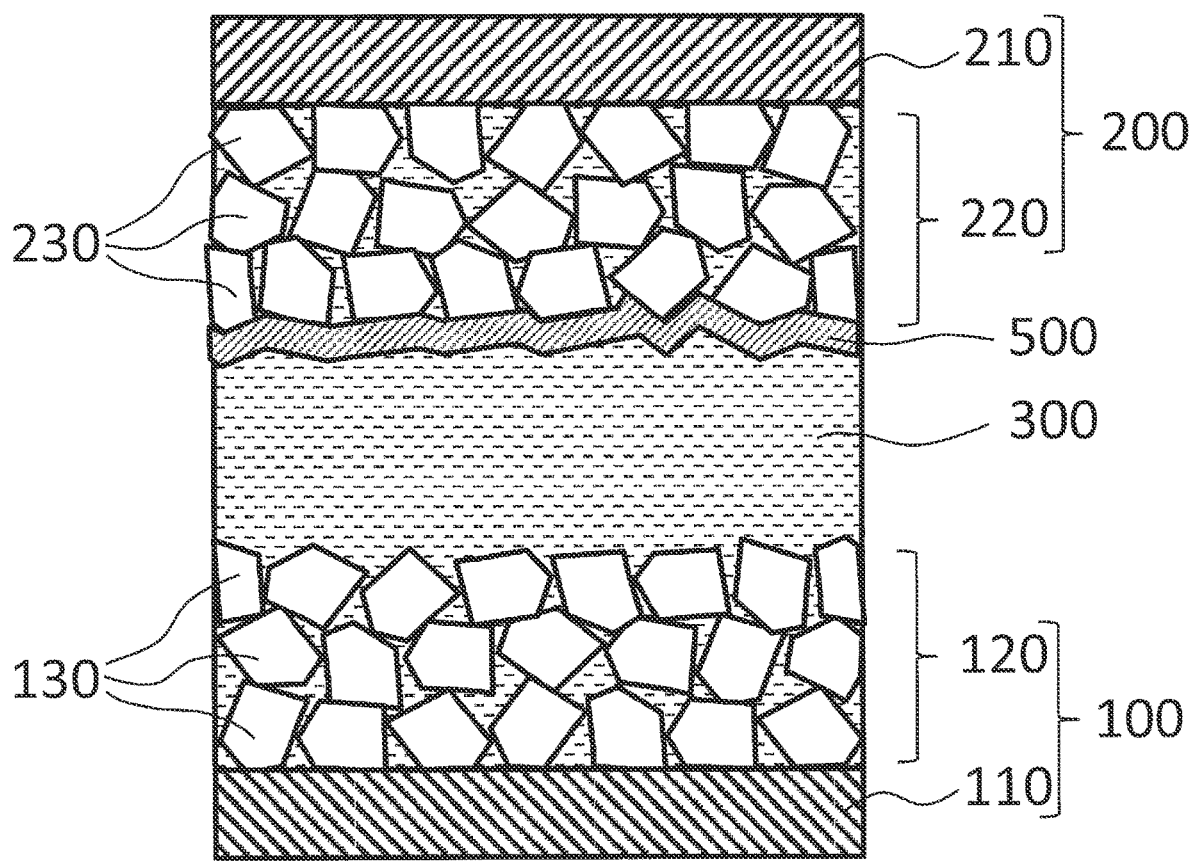
FIG. 6 is a cross-sectional view schematically showing Modification 2 of the secondary battery according to the first embodiment.

FIG. 6 is a schematic cross-sectional view showing a structure of a secondary battery 1000b as Modification 2 of the secondary battery according to the first embodiment.

The secondary battery 1000b includes a positive electrode 100, a negative electrode 200, an electrolyte solution 300, and a solid electrolyte layer 500. In other words, the secondary battery 1000b has the structure of the secondary battery 1000a from which the solid electrolyte layer 400 is removed. Components of the secondary battery 1000b are the same as corresponding those of the secondary battery 1000, and accordingly description thereof is omitted.

The secondary battery 1000b exhibits the same effects as the effects arising from the solid electrolyte layer 500 described in the above section [5-1. Modification 1].

5-3. Modification 3

Figure 7:
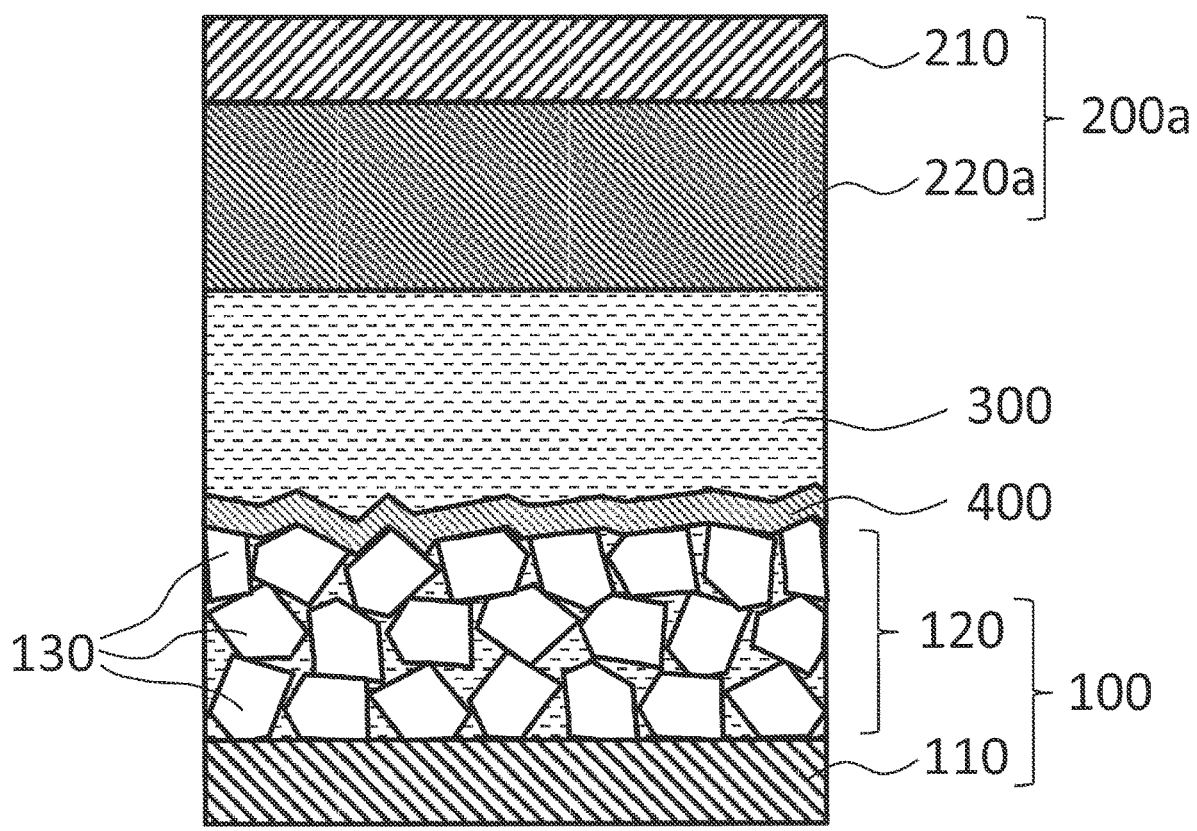
FIG. 7 is a cross-sectional view schematically showing Modification 3 of the secondary battery according to the first embodiment.

FIG. 7 is a schematic cross-sectional view showing a structure of a secondary battery 1000c as Modification 3 of the secondary battery according to the first embodiment.

The secondary battery 1000c includes a positive electrode 100, a negative electrode 200a, an electrolyte solution 300, and a solid electrolyte layer 400. The negative electrode 200a includes a negative electrode current collector 210 and a negative electrode active material layer 220a. Components of the secondary battery 1000c excluding the negative electrode active material layer 220a are the same as corresponding those of the secondary battery 1000, and accordingly description thereof is omitted.

The negative electrode active material layer 220a is a flat layer disposed on the negative electrode current collector 210. A material of the negative electrode active material layer 220a can be for example selected from the various materials listed in the above section [4-4. Negative electrode]. The negative electrode active material layer 220a can be formed by for example the physical deposition method or the chemical deposition method.

The secondary battery 1000c exhibits the same effects as the various effects described in the above section [4-7. Effects].

5-4. Modification 4

Figure 8:
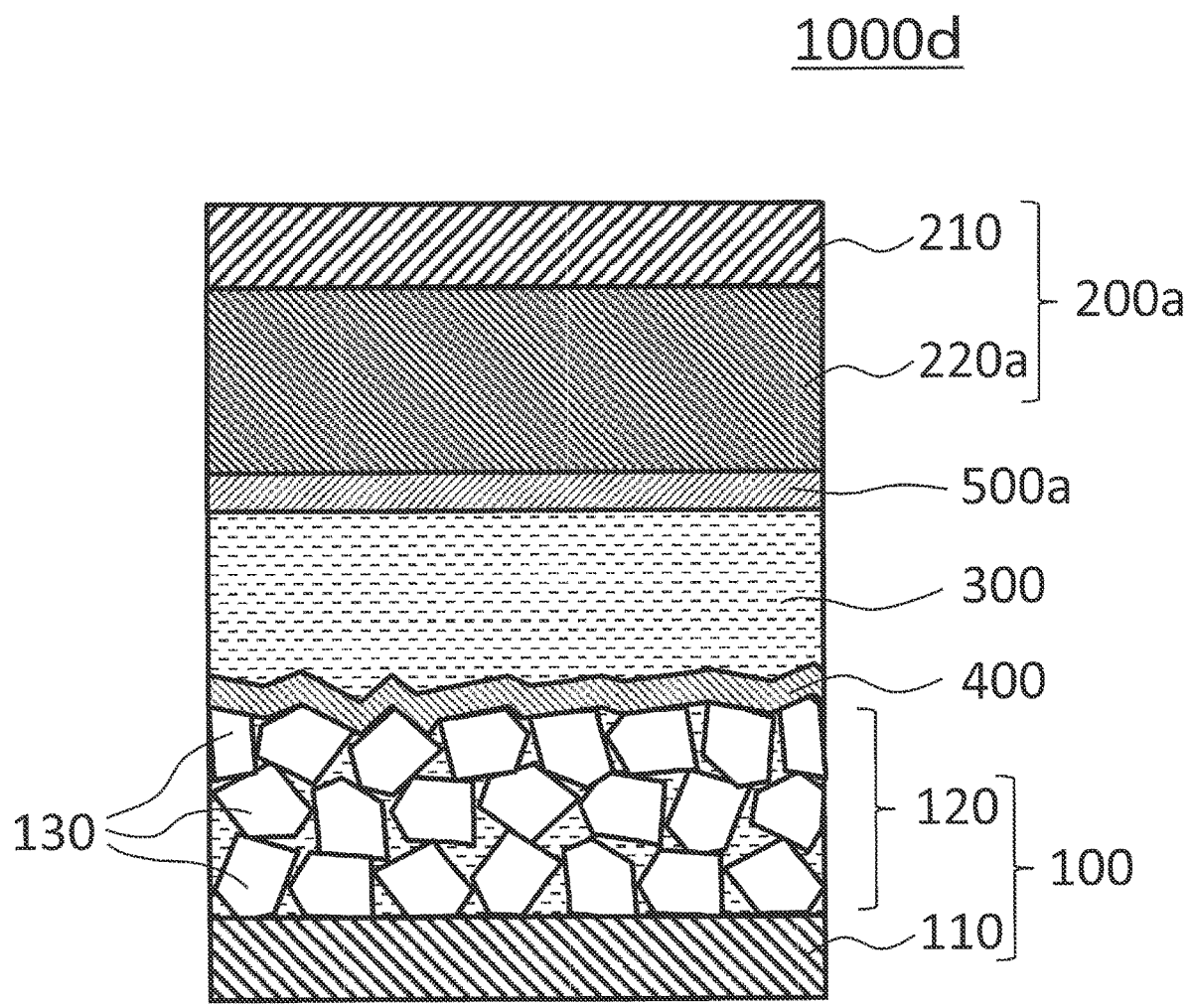
FIG. 8 is a cross-sectional view schematically showing Modification 4 of the secondary battery according to the first embodiment.

FIG. 8 is a schematic cross-sectional view showing a structure of a secondary battery 1000d as Modification 4 of the secondary battery according to the first embodiment.

The secondary battery 1000d includes a positive electrode 100, a negative electrode 200a, an electrolyte solution 300, a solid electrolyte layer 400, and a solid electrolyte layer 500a. Components of the secondary battery 1000d excluding the solid electrolyte layer 500a are the same as corresponding those of the secondary battery 1000c, and accordingly description thereof is omitted.

The solid electrolyte layer 500a is a flat layer disposed on the negative electrode active material layer 220a. A material and a method of forming the solid electrolyte layer 500a are as described in the above section [4-5. Solid electrolyte layer].

The secondary battery 1000d exhibits the same effects as the various effects described in the above section [5-1. Modification 1].

5-5. Modification 5

Figure 9:
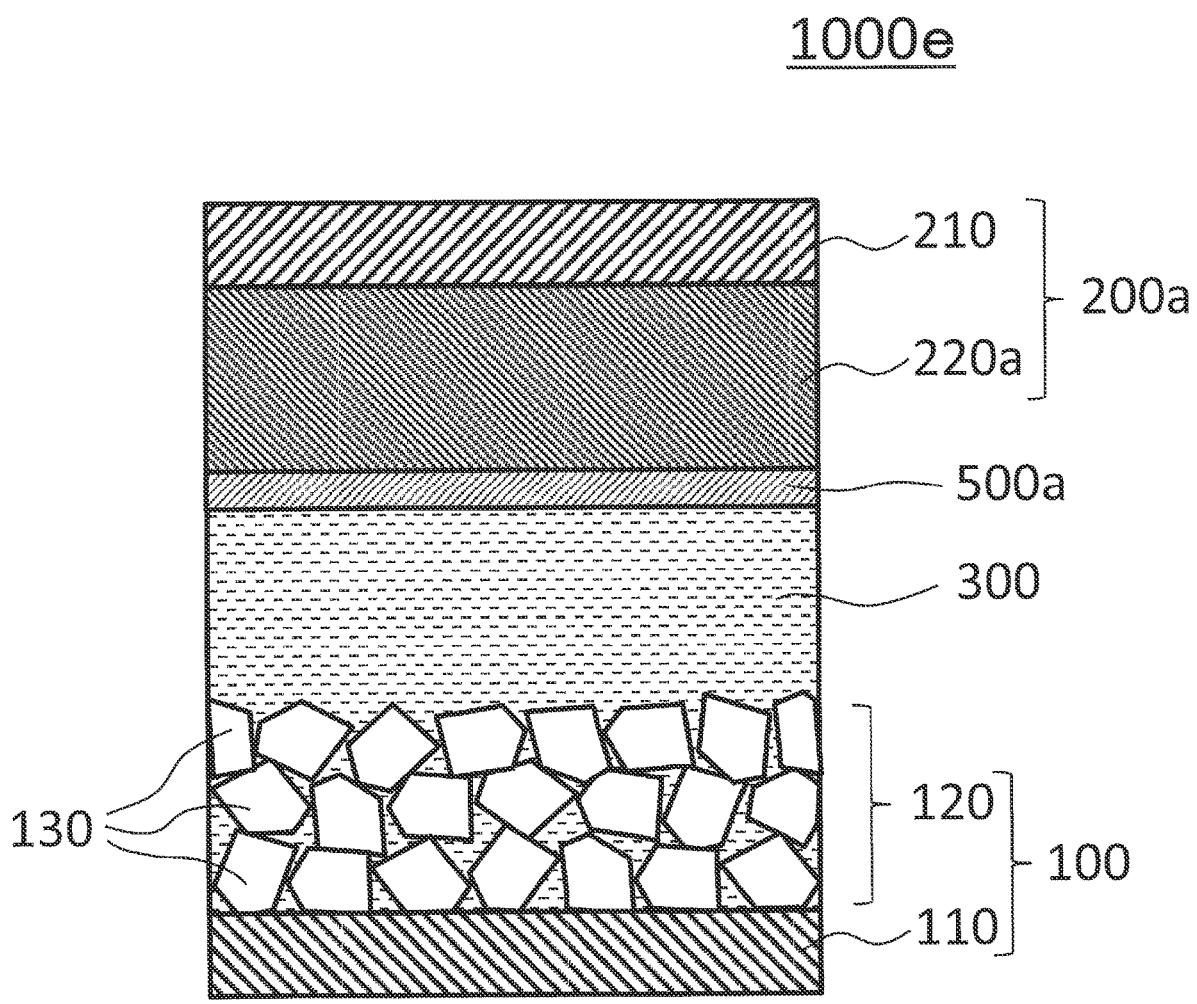
FIG. 9 is a cross-sectional view schematically showing Modification 5 of the secondary battery according to the first embodiment.

FIG. 9 is a schematic cross-sectional view showing a structure of a secondary battery 1000e as Modification 5 of the secondary battery according to the first embodiment.

The secondary battery 1000e includes a positive electrode 100, a negative electrode 200a, an electrolyte solution 300, and a solid electrolyte layer 500a. In other words, the secondary battery 1000e has the structure of the secondary battery 1000d from which the solid electrolyte layer 400 is removed. Components of the secondary battery 1000e are the same as corresponding those of the secondary battery 1000d, and accordingly description thereof is omitted.

The secondary battery 1000e exhibits the same effects as the effects arising from the solid electrolyte layer 500 described in the above section [5-2. Modification 2].

Second Embodiment 6-1. Structure of Secondary Battery

Figure 10:
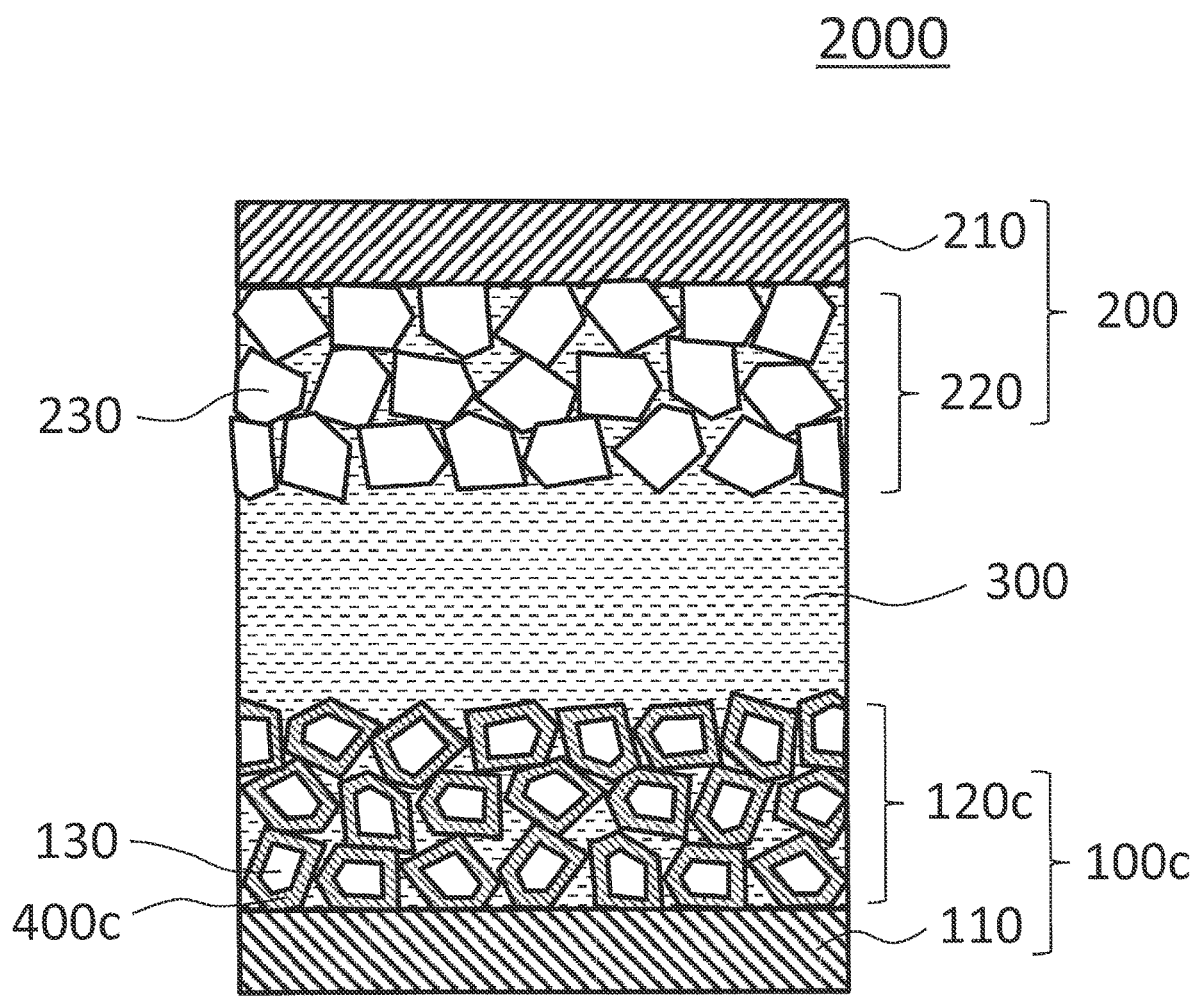
FIG. 10 is a cross-sectional view schematically showing a structural example of a secondary battery according to a second embodiment.

FIG. 10 is a schematic cross-sectional view showing a structure of a secondary battery 2000 according to a second embodiment.

The secondary battery 2000 has the same structure as the secondary battery 1000 described in the first embodiment except a positive electrode 100c and solid electrolyte coats 400c.

In the second embodiment, the secondary battery 2000 includes positive electrode materials. The positive electrode materials each include a positive electrode active material particle 130 and the solid electrolyte coats 400c covering the respective positive electrode active material particles 130. The solid electrolyte coat 400c includes a covering material for a positive electrode active material of a magnesium secondary battery. The solid electrolyte coat 400c covers the positive electrode active material particle 130, and thus a surface of the positive electrode active material particle is not exposed or is less likely to be exposed in a gap between the positive electrode active material particles. Thus, even in the case for example where an electrolyte solution fills the gap, oxidative decomposition of the electrolyte solution can be further effectively suppressed. In the present description, "solid electrolyte coat 400c" is referred to also as "surface layer 400c".

The positive electrode 100c includes a positive electrode current collector 110 and a positive electrode active material layer 120c. The positive electrode active material layer 120c is disposed on the positive electrode current collector 110, and includes the positive electrode active material particles 130. The respective surfaces of the positive electrode active material particles 130 are covered with the solid electrolyte coats 400c. This structure can suppress movement of electrons between the positive electrode active material particles 130 and the electrolyte solution 300. Consequently, oxidative decomposition of the electrolyte solution 300 can be suppressed. Also, the solid electrolyte coats 400c cover the respective surfaces of the positive electrode active material particles 130 thereby to suppress passive film generation on the positive electrode 100c. The solid electrolyte coat 400c is one example of a surface layer covering a positive electrode active material particle.

6-2. Positive Electrode and Solid Electrolyte Coats

The secondary battery 2000 is the same as the secondary battery described in the first embodiment except the shape of the solid electrolyte and methods of forming the solid electrolyte and the positive electrode, and accordingly description thereof is omitted. Specifically, a material of the solid electrolyte coat 400c can be for example selected from the various materials listed in the section [4-5. Solid electrolyte layer] in the first embodiment.

The solid electrolyte coat 400c may be either in the form of powder or in the form of thin film. The solid electrolyte coat 400c in the form of thin film can be easily formed along the positive electrode active material particle 130, improving covering properties. A film thickness of the solid electrolyte coat 400c may be for example 1 nm or more and 200 nm or less.

The positive electrode 100c and the solid electrolyte coat 400c are formed for example as follows.

First, a solid electrolyte covers the surface of the positive electrode active material particle 130 thereby to form the solid electrolyte coat 400c. Subsequently, the covered positive electrode active material particle 130, an electrically-conductive material, and a binding material are mixed together. Subsequently, an appropriate solvent is added to this mixture thereby to obtain a positive electrode composite material in the form of paste. Subsequently, this positive electrode composite material is applied onto the surface of the positive electrode current collector 110, followed by drying. As a result, the positive electrode 100c is obtained.

The solid electrolyte coat 400c may be formed by for example depositing a solid electrolyte material using the above-mentioned physical deposition method or chemical deposition method, while moving the positive electrode active material particle 130. Alternatively, the solid electrolyte coat 400c may be formed for example by the above-mentioned sol-gel method or liquid phase deposition method.

6-3. Effects

The secondary battery 2000 exhibits the same effects as the various effects described in the first embodiment. Specifically, the effects exhibited by the secondary battery 2000 can be comprehended by appropriately replacing, in the description in the section [4-7. Effects] of the first embodiment, the "solid electrolyte layer 400" with the "solid electrolyte coat 400c".

According to the secondary battery 2000, the respective positive electrode active material particles 130 are covered with the solid electrolyte coat 400c. Owing to this, the surface of the positive electrode active material particle 130 is not exposed or is less likely to be exposed in a gap between the positive electrode active material particles 130. Thus, even in the case for example where the electrolyte solution 300 fills the gap, oxidative decomposition of the electrolyte solution 300 can be further effectively suppressed. Also, the solid electrolyte coats 400c can effectively suppress passive film generation on the positive electrode 100c.

6-4. Various Modifications

6-4-1. Modification 1

Figure 11:
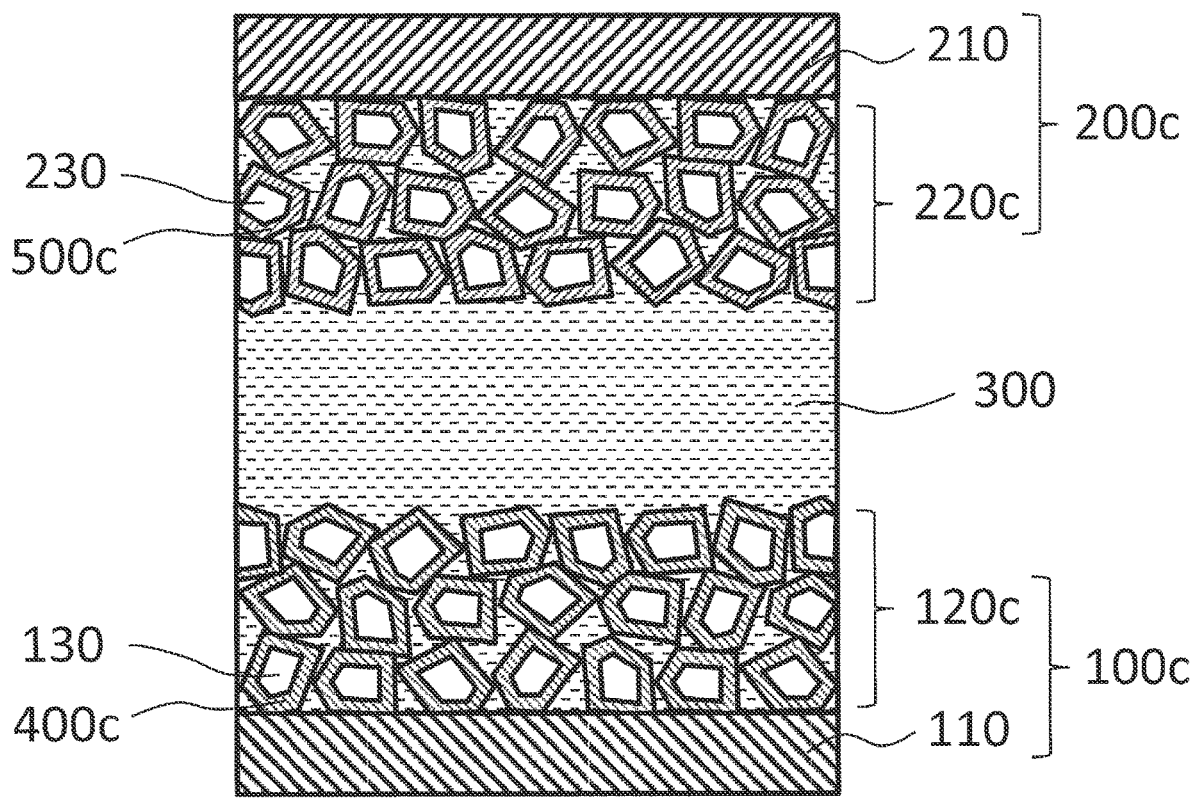
FIG. 11 is a cross-sectional view schematically showing Modification 1 of the secondary battery according to the second embodiment.

FIG. 11 is a schematic cross-sectional view showing a structure of a secondary battery 2000a as Modification 1 of the secondary battery according to the second embodiment.

The secondary battery 2000a has the same structure as the secondary battery 2000 except a negative electrode 200c and solid electrolyte coats 500c.

In Modification 1, the secondary battery 2000a includes negative electrode materials. The negative electrode materials each include a negative electrode active material particle 230 and the solid electrolyte coat 500c covering the negative electrode active material particle 230. The solid electrolyte coat 500c includes a covering material for a negative electrode active material of a magnesium secondary battery. The solid electrolyte coat 500c covers the negative electrode active material particle 230, and thus a surface of the negative electrode active material particle is not exposed or is less likely to be exposed in gaps between the negative electrode active material particles. Thus, even in the case for example where an electrolyte solution fills these gaps, reductive decomposition of the electrolyte solution can be further effectively suppressed. In the present description, "solid electrolyte coat 500c" is referred to also as "surface layer 500c".

The negative electrode 200c includes a negative electrode current collector 210 and a negative electrode active material layer 220c. The negative electrode active material layer 220c is disposed on the negative electrode current collector 210, and includes negative electrode active material particles 230. The respective surfaces of the negative electrode active material particles 230 are covered with the solid electrolyte coat 500c. This structure can suppress movement of electrons between the negative electrode active material particles 230 and the electrolyte solution 300. Consequently, reductive decomposition of the electrolyte solution 300 can be suppressed. Also, the solid electrolyte coat 500c covers the surface of the negative electrode active material particle 230 thereby to suppress passive film generation on the negative electrode 200c. The solid electrolyte coat 500c is one example of a surface layer covering negative electrode active material particle.

A material of the solid electrolyte coat 500c can be for example selected from the materials mentioned in the section [4-5. Solid electrolyte layer] of the first embodiment. The solid electrolyte coat 500c may be either in the form of powder or in the form of thin film. The solid electrolyte coat 500c in the form of thin film can be easily formed along the negative electrode active material particle 230, improving covering properties. A film thickness of the solid electrolyte coat 500c may be for example 1 nm or more and 200 nm or less.

Methods of forming the negative electrode 200c and the solid electrolyte coat 500c may be for example the same as the methods described in the above section [6-2. Positive electrode and solid electrolyte coats].

The secondary battery 2000a exhibits effects arising from the solid electrolyte coat 500c, in addition to the various effects described in the above section [6-3. Effects]. The effects arising from the solid electrolyte coats 500c can be comprehended by appropriately replacing, in the description of the above section [4-7. Effects], the "solid electrolyte layer 400" and the "positive electrode 100" with the "solid electrolyte coat 500c" and the "negative electrode 200c", respectively.

According to the secondary battery 2000a, the respective negative electrode active material particles 230 are covered with the solid electrolyte coats 500c. Thus, even in the case where the electrolyte solution 300 fills gaps between the negative electrode active material particles 230, reductive decomposition of the electrolyte solution 300 can be further effectively suppressed. Also, the solid electrolyte coats 500c can effectively suppress passive film generation on the negative electrode 200c.

6-4-2. Modification 2

Figure 12:
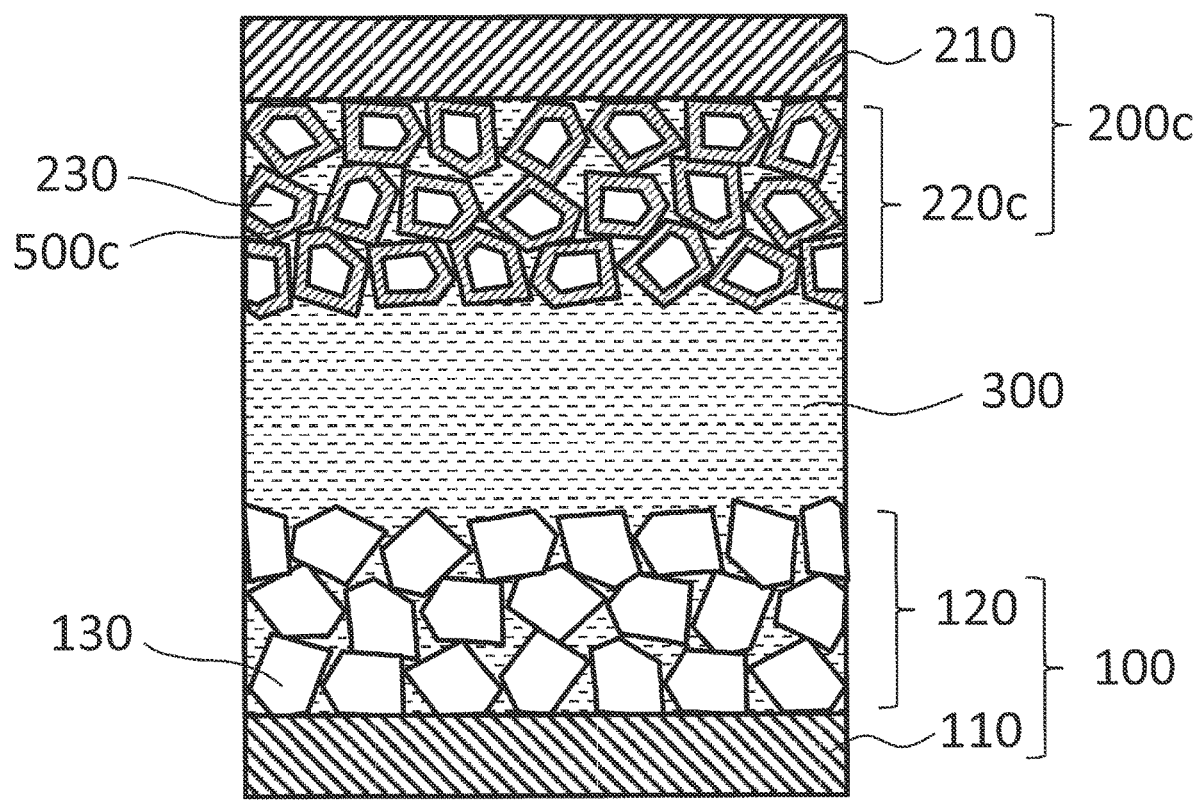
FIG. 12 is a cross-sectional view schematically showing Modification 2 of the secondary battery according to the second embodiment.

FIG. 12 is a schematic cross-sectional view showing a secondary battery 2000b as Modification 2 of the secondary battery according to the second embodiment.

The secondary battery 2000b has the structure of the secondary battery 2000a from which the solid electrolyte coats 400c are removed. Components of the secondary battery 2000b are the same as corresponding those of the secondary battery 2000a, and accordingly description thereof is omitted.

The secondary battery 2000b exhibits the same effects as the effects arising from the solid electrolyte coats 500c described in the above section [6-4-1. Modification 1].

6-4-3. Other Modifications

The above-described secondary batteries 2000, 2000a, and 2000b may be combined with any one of the secondary batteries 1000, 1000a, 1000b, 1000c, 1000d, and 1000e described in the first embodiment.

For example, the negative electrode 200 of the secondary battery 2000 may be replaced with the negative electrode 200a described in the section [5-3. Modification 3] of the first embodiment. Furthermore, the solid electrolyte layer 500a described in the Section [5-4. Modification 4] of the first embodiment may be added.

7. Experiment Result

Various examples of the solid electrolyte film according to the present embodiment will be described.

7-1. Example 1

A magnesium phosphate film according to Example 1 was manufactured by using the manufacturing device 21 shown in FIG. 2. In this example, the same manufacturing method as the flow shown in FIG. 3B was performed.

The first precursor supply unit 23 and the second precursor supply unit 24 were each a precursor bottle (manufactured by Japan Advanced Chemicals Ltd.). The reactor 22, a sample holder placed in the reactor 22, the first precursor supply unit 23, the second precursor supply unit 24, and various pipes used were made of stainless steel (SUS316). A ribbon heater was wound around the reactor 22, the first precursor supply unit 23, the second precursor supply unit 24, and the various pipes, and the ribbon heater was heated thus to heat the parts. The temperatures of the parts were measured by a thermocouple and controlled by a temperature controller. The mass flow controllers 26a to 26e and the valves V1 to V8 were controlled by using a sequencer (MELSEC-Q: manufactured by Mitsubishi Electric Corporation) and a control program (manufactured by Nihon Spread Co.). The needle valve NV was a bellows-sealed valve (SS-4VMG: manufactured by Swagelok). The degree of vacuum in the reactor 22 was measured by using the Pirani gauge (TPR280 DN16 ISO-KF: manufactured by Pfeiffer Vacuum). The degree of vacuum in the reactor 22 during film formation was controlled from $10^{-1}$ Pa to $10^3$ Pa by adjusting the opening degree of the manual valve MV4.

A substrate was a glass substrate having an Au electrode formed thereon. The Au electrode was an interdigitated electrode of 5 μm pitch. The glass substrate having the Au electrode was arranged inside the reactor 22. The first precursor was bis(ethylcyclopentadienyl) magnesium, and the second precursor was tris(dimethylamino) phosphine (TDMAP). A purge gas was an argon gas. The oxygen supply unit 33 was capable of supplying an oxygen gas. The temperature inside the reactor 22 was set to 250° C. The temperature of the first precursor supply unit 23 was set to 40° C. The temperature of the second precursor supply unit 24 was set to 40° C. The temperature of the first pipe P1 was set to 170° C. The temperatures of all of the pipes other than the first pipe P1 and the second pipe P2 were set to 200° C. The flow rates of the oxygen gas and the purge gas were set to 50 ml/min. The manual valves MV1 and MV2 were normally opened, and the flow rates of auxiliary gases from the auxiliary gas supply units 27 and 29 were set to 50 ml/min. The opening degree of the needle valve NV was 50%.

Prior to Step S1 shown in FIG. 3B, the following preparation step was performed.

The valve V8 was opened to supply the purge gas from the purge gas supply unit 34 into the reactor 22 for approximately 1800 seconds, and the valve V8 was closed. Subsequently, the valve V7 was opened to supply the oxygen gas from the oxygen supply unit 33 into the reactor 22 for six seconds, and the valve V7 was closed. Then, a purging step was performed for eight seconds. After the preparation step, the repetition cycle shown in FIG. 3B was performed 1000 times. As a result of composition analysis by using an XPS device (Quamtera SXM: manufactured by ULVAC-PHI, Inc), a composition formula of Example 1 was $Mg_{3.1}(PO_{3.1})_2$.

7-2. Example 2

A magnesium phosphate film according to Example 2 was manufactured under the same conditions as those of Example 1 except that the temperature inside the reactor 22 during film formation was set to 125° C. As a result of composition analysis by using the XPS device, a composition formula of Example 2 was $Mg_{3.1}(PO_{3.0})_2$.

7-3. Example 3

A magnesium phosphate film having zirconium added thereto according to Example 3 was manufactured by using the manufacturing device 21 shown in FIG. 2. In this example, the same manufacturing method as the flow shown in FIG. 3D was performed.

The first precursor supply unit 23, the second precursor supply unit 24, and the third precursor supply unit 25 were each a precursor bottle (manufactured by Japan Advanced Chemicals Ltd.). The reactor 22, a sample holder placed in the reactor 22, the first precursor supply unit 23, the second precursor supply unit 24, the third precursor supply unit 25, and various pipes used were made of stainless steel (SUS316). A ribbon heater was wound around the reactor 22, the first precursor supply unit 23, the second precursor supply unit 24, the third precursor supply unit 25, and the various pipes, and the ribbon heater was heated thus to heat the parts. The temperatures of the parts were measured by a thermocouple and controlled by a temperature controller. The mass flow controllers 26a to 26e and the valves V1 to V8 were controlled by using a sequencer (MELSEC-Q: manufactured by Mitsubishi Electric Corporation) and a control program (manufactured by Nihon Spread Co.). The needle valve NV was a bellows-sealed valve (SS-4VMG: manufactured by Swagelok). The degree of vacuum in the reactor 22 was measured by using the Pirani gauge (TPR280 DN16 ISO-KF: manufactured by Pfeiffer Vacuum). The degree of vacuum in the reactor 22 during film formation was controlled from $10^{-1}$ Pa to $10^3$ Pa by adjusting the opening degree of the manual valve MV4.

A substrate was a glass substrate having an Au electrode formed thereon. The Au electrode was an interdigitated electrode of 5 μm pitch. The glass substrate having the Au electrode was arranged inside the reactor 22. The first precursor was bis(ethylcyclopentadienyl) magnesium, the second precursor was tris(dimethylamino)phosphine (TDMAP), and the third precursor was tetrakisethylmethylaminozirconium. A purge gas was an argon gas. The oxygen supply unit 33 was capable of supplying an oxygen gas. The temperature inside the reactor 22 was set to 250° C. The temperature of the first precursor supply unit 23 was set to 40° C. The temperature of the second precursor supply unit 24 was set to 40° C. The temperature of the third precursor supply unit 25 was set to 45° C. The temperatures of the first pipe P1, the second pipe P2, and the third pipe P3 were set to 170° C. The temperatures of all of the pipes other than the pipes P1 to P3 were set to 200° C. The flow rates of the oxygen gas and the purge gas were set to 50 ml/min. The manual valves MV1 to MV3 were normally opened, and the flow rates of auxiliary gases from the auxiliary gas supply units 27, 29, and 31 were set to 50 ml/min. The opening degree of the needle valve NV was 50%.

Prior to Step SS1 shown in FIG. 3D, the following preparation step was performed.

The valve V8 was opened to supply the purge gas from the purge gas supply unit 34 into the reactor 22 for approximately 1800 seconds, and the valve V8 was closed. Subsequently, the valve V7 was opened to the oxygen gas was supplied from the oxygen supply unit 33 into the reactor 22 for six seconds, and the valve V7 was closed. Then, a purging step was performed for eight seconds. After the preparation step, the repetition cycle shown in FIG. 3D was performed 1000 times. As a result of composition analysis by using an XPS device (Quamtera SXM: manufactured by ULVAC-PHI, Inc), a composition formula of Example 3 was $Mg_{2.5}Zr_{0.9}(PO_{3.6})_2$.

7-4. Example 4

A magnesium phosphate film having zirconium added thereto according to Example 4 was manufactured under the same conditions as those of Example 3 except that the temperature inside the reactor 22 during film formation was set to 125° C. As a result of composition analysis by using the XPS device, a composition formula of Example 4 was $Mg_{2.4}Zr_{1.0}(PO_{3.5})_2$.

Figure 13:
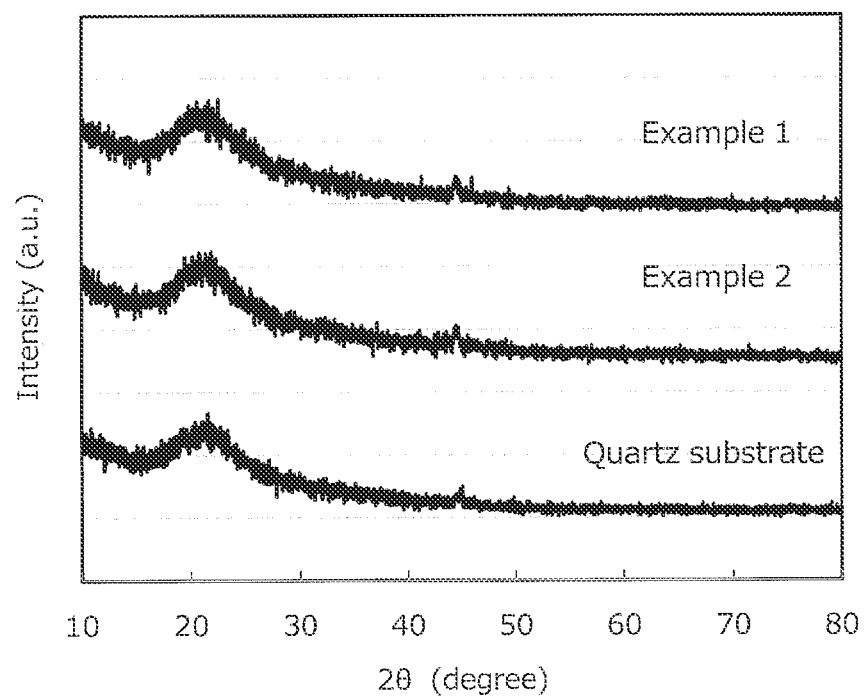
FIG. 13 shows XRD diffraction patterns of solid electrolytes according to Examples 1 and 2.
Figure 14:
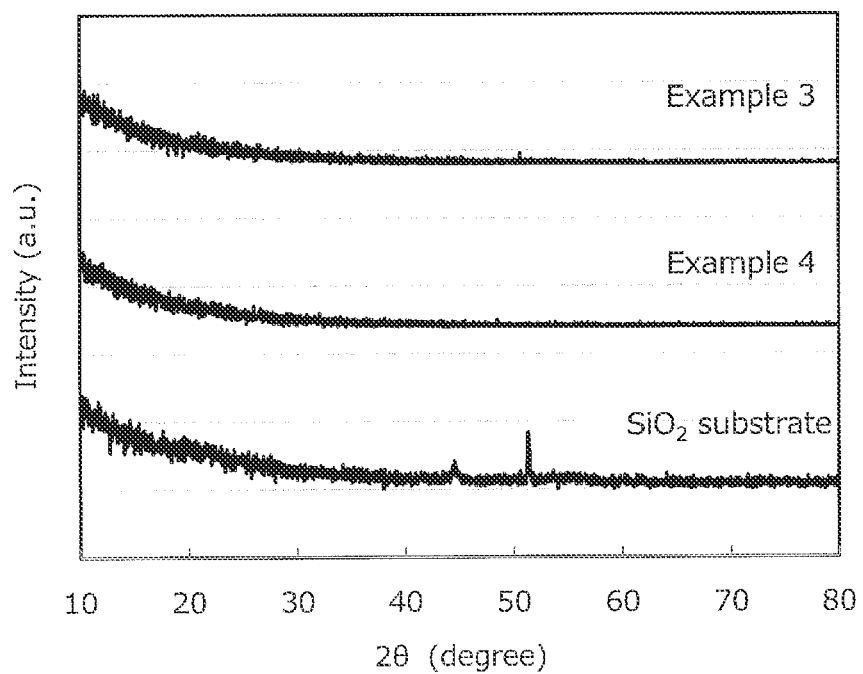
FIG. 14 shows XRD diffraction patterns of solid electrolytes according to Examples 3 and 4.

7-5. Structure Analysis of Magnesium Phosphate Film and Magnesium Phosphate Film to which Zirconium is Added Crystalline evaluation was performed on the solid electrolytes of Examples 1 to 4 by X-ray diffraction (XRD). In each of Examples 1 and 2, a solid electrolyte formed on a glass substrate was used as a sample. In each of Examples 3 and 4, a solid electrolyte formed on a silicon substrate having a thermally-oxidized film was used as a sample. Structure analysis was performed on the samples by using an XRD instrument (SmartLab: manufactured by Rigaku Corporation) with a θ-2θ method of wide-angle X-ray diffraction. As shown in FIG. 13 and FIG. 14, the solid electrolytes of Examples 1 to 4 were amorphous bodies. Note that broad peaks observed around θ=20° to 30° in FIG. 13 derive from a quartz substrate, and peaks observed around θ=45° to 55° in FIG. 14 derive from a silicon substrate.

7-6. Ionic Conductivity Measurement

Ionic conductivity measurement was performed on the magnesium phosphate films and the magnesium phosphate films having zirconium added thereto according to Examples 1 to 4, by using an electrochemical measurement device (Modulab: manufactured by Solartron Analytical).

Figure 15:
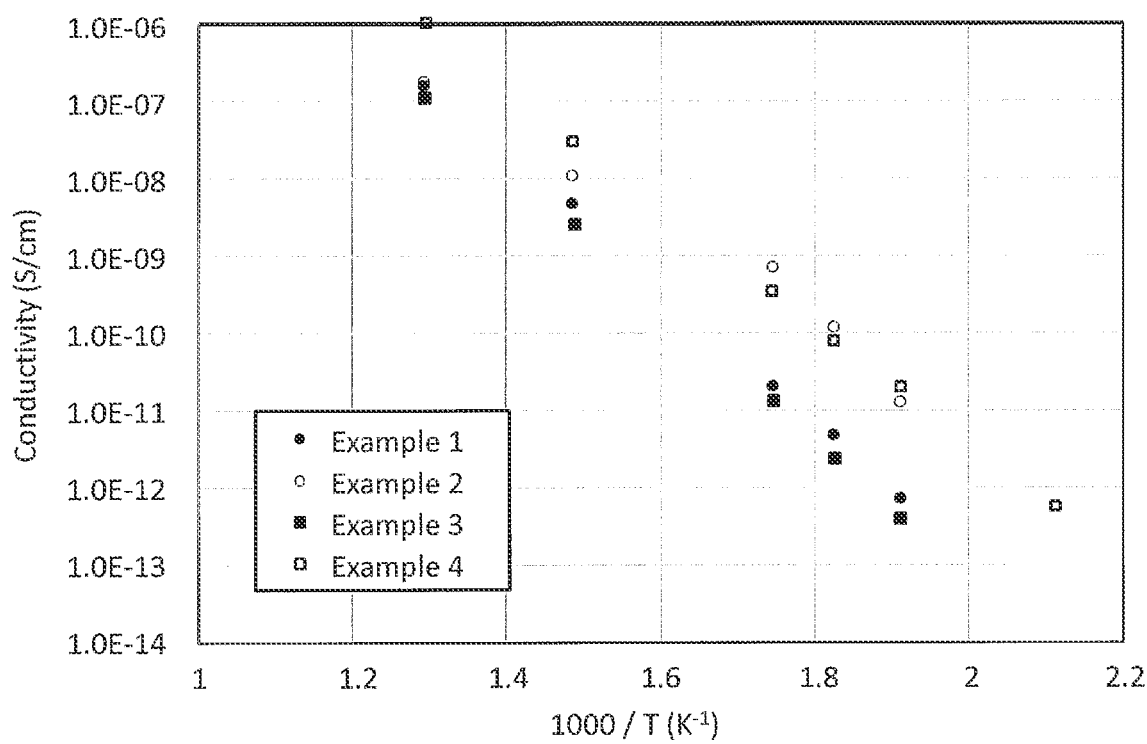
FIG. 15 shows relationship between temperature relating to solid electrolytes of Examples 1 to 4 and ionic conductivity.

FIG. 15 shows temperature dependency of the ionic conductivity of the magnesium phosphate films and the magnesium phosphate films having zirconium added thereto according to Examples 1 to 4. Measurement results of Examples 1 to 4 are respectively represented by black circles, white circles, black squares, and white squares. As shown in FIG. 15, Examples 2 and 4 with low film formation temperatures exhibited a high ionic conductivity. This is probably caused by the following reasons. As shown in FIG. 13 and FIG. 14, the magnesium phosphate films and the magnesium phosphate films having zirconium added thereto according to Examples 1 to 4 all had the amorphous structure. A low film formation temperature results in formation of a sparser film. This is considered to achieve a space through which magnesium ions pass thereby to achieve an increased magnesium ionic conductivity.

Also, a comparison is made on the magnesium phosphate film according to Example 2 and the magnesium phosphate film having zirconium added thereto according to Example 4. In a low temperature region, Examples 2 and 4 exhibited the same level of magnesium ionic conductivity. Meanwhile, in a high temperature region, the magnesium phosphate film having zirconium added thereto according to Example 4 exhibited a higher magnesium ionic conductivity. This is because of the following reasons. While magnesium phosphate starts to be decomposed around 500° C., addition of zirconium to magnesium phosphate improves a thermal stability of a solid electrolyte film thereby to suppress this decomposition, in other words, addition of zirconium to magnesium phosphate improves a structural stability of the magnesium phosphate.

INDUSTRIAL APPLICABILITY

The solid electrolyte according to the present disclosure are usable for, for example, manufacturing all-solid-state secondary batteries.

What is claimed is:

1. An electrode material of a magnesium secondary battery, the electrode material comprising:
    an electrode active material particle of the magnesium secondary battery; and
    a surface layer covering the electrode active material particle, wherein
    the surface layer includes a covering material, and
    the covering material includes a solid electrolyte having a composition represented by $Mg_x(PO_z)_2$, where $3.1 \leq x \leq 3.5$ and $3 \leq z \leq 4.25$, and comprising an amorphous part.

2. The electrode material of the magnesium secondary battery according to claim 1, wherein
    the electrode active material particle is a positive electrode active material particle.

3. The electrode material of the magnesium secondary battery according to claim 1, wherein
    the electrode active material particle is a negative electrode active material particle.

4. An electrode layer of a magnesium secondary battery, the electrode layer comprising the electrode material according to claim 1.

5. An electrode layer of a magnesium secondary battery, the electrode layer comprising:
    an electrode active material layer including electrode active material particles of the magnesium secondary battery; and
    a surface layer that is disposed on one principal surface of the electrode active material layer and includes a covering material covering an electrode active material of the magnesium secondary battery,
    wherein the covering material includes a solid electrolyte having a composition represented by $Mg_x(PO_z)_2$, where $3.1 \leq x \leq 3.5$ and $3 \leq z \leq 4.25$, and comprising an amorphous part.

6. The electrode layer of the magnesium secondary battery according to claim 5, wherein
    the electrode active material particles are positive electrode active material particles.

7. The electrode layer of the magnesium secondary battery according to claim 5, wherein
    the electrode active material particles are negative electrode active material particles.

8. An electrode of a magnesium secondary battery, the electrode comprising:
    the electrode layer according to claim 4; and
    a current collector supporting the electrode layer and being in electrical contact with the electrode layer.

9. A magnesium secondary battery comprising:
    the electrode according to claim 8; and
    an electrolyte solution containing a nonaqueous solvent and a magnesium salt dissolved in the nonaqueous solvent.

10. The electrode material of the magnesium secondary battery according to claim 1, wherein $4 < z \leq 4.25$.

* * * * *